United States Patent
Takaoka et al.

(10) Patent No.: US 7,039,870 B2
(45) Date of Patent: May 2, 2006

(54) METHOD FOR CONNECTING COMPUTER SYSTEMS

(75) Inventors: Nobumitsu Takaoka, Yokohama (JP); Yasunori Kaneda, Sagamihara (JP); Satoshi Miyazaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 601 days.

(21) Appl. No.: 10/066,676

(22) Filed: Feb. 6, 2002

(65) Prior Publication Data

US 2003/0085914 A1 May 8, 2003

(30) Foreign Application Priority Data

Nov. 7, 2001 (JP) .............................. 2001-341371

(51) Int. Cl.
*G06F 3/00* (2006.01)
(52) U.S. Cl. ...................... 715/736; 715/735; 715/743; 709/224
(58) Field of Classification Search ................ 715/735, 715/736, 733, 734, 737, 738, 739, 781, 790; 709/220, 221, 222, 223
See application file for complete search history.

(56) References Cited

U.S. PATENT DOCUMENTS

| | | | | |
|---|---|---|---|---|
| 5,559,955 A | * | 9/1996 | Dev et al. ...................... | 714/4 |
| 5,764,911 A | * | 6/1998 | Tezuka et al. ............... | 709/223 |
| 6,061,753 A | | 5/2000 | Ericson | |
| 6,118,776 A | | 9/2000 | Berman | |
| 6,181,341 B1 | * | 1/2001 | Shinagawa ................... | 715/734 |
| 6,330,005 B1 | * | 12/2001 | Tonelli et al. .............. | 715/735 |
| 6,535,227 B1 | * | 3/2003 | Fox et al. .................... | 715/736 |
| 6,570,608 B1 | * | 5/2003 | Tserng ........................ | 348/143 |
| 6,577,327 B1 | * | 6/2003 | Rochford et al. ........... | 715/735 |
| 6,636,239 B1 | * | 10/2003 | Arquie et al. ............... | 715/736 |
| 6,772,204 B1 | * | 8/2004 | Hansen ....................... | 709/220 |

FOREIGN PATENT DOCUMENTS

| | | |
|---|---|---|
| JP | 8-137810 | 5/1996 |
| JP | 10-145364 | 5/1998 |
| JP | 10-232843 | 9/1998 |
| JP | 10-294731 | 11/1998 |
| JP | 10-333839 | 12/1998 |
| JP | 11-340980 | 12/1999 |
| JP | 11-346224 | 12/1999 |

* cited by examiner

*Primary Examiner*—Kieu D. Vu
(74) *Attorney, Agent, or Firm*—Mattingly, Stanger, Malur & Brundidge, P.C.

(57) ABSTRACT

In a storage network, two access restriction methods, i.e., zoning and LUN security are available. These functions must be set for each units of the storage network. This disadvantageously takes a long period time and manpower. Since the setting is independently conducted for each unit, inconsistent setting cannot be prevented. A utility program having a management console screen using integrated representation of the zoning and the LUN security is provided. The program removes the user's setting operation for each unit and detects any inconsistent user's operation for the screen. Therefore, the inconsistent setting can be prevented.

10 Claims, 20 Drawing Sheets

FIG. 11

| | | | | |
|---|---|---|---|---|
| s1 | (65,195)–(30,30) | COMPUTER 1 | HOST_PORT | H1P0 |
| s2 | (165,45)–(30,30) | COMPUTER 2 | HOST_PORT | H2P0 |
| s3 | (260,45)–(30,30) | COMPUTER 3 | HOST_PORT | H3P0 |
| s4 | (165,150)–(15,15) | PORT 0 | STORAGE_PORT | S1P0 |
| s5 | (255,135)–(15,15) | PORT 1 | STORAGE_PORT | S1P1 |
| s6 | (30,165)–(30,30) | LUN0 | LU | S1P0L0 |
| s7 | (105,45)–(30,30) | LUN1 | LU | S1P0L1 |
| s8 | (300,150)–(30,30) | LUN0 | LU | S1P1L0 |
| s9 | (225,45)–(30,30) | LUN1 | LU | S1P1L0 |

| a1 | (15,120)-(120,270) | Area1 | 1 |
|---|---|---|---|
| a2 | (75,30)-(285,165) | Area2 | 1 |
| a3 | (240,105)-(345,255) | Area3 | 1 |

| a1 | s1 |
|---|---|
| a1 | s4 |
| a1 | s6 |
| a2 | s2 |
| a2 | s4 |
| a2 | s5 |
| a2 | s7 |
| a2 | s8 |
| a3 | s3 |
| a3 | s5 |
| a3 | s9 |

| z1 | a1 | zone81 |
|---|---|---|
| z2 | a2 | zone82 |
| z3 | a3 | zone83 |

| s6 | s4 | 0 |
|----|----|---|
| s7 | s4 | 0 |
| s8 | s5 | 1 |
| s9 | s5 | 1 |

| H1P0 | XX:00:00:00:00:00:00:01 | H1 | 0 | 1.2.3.4 |
|------|-------------------------|----|----|---------|
| H2P0 | XX:00:00:00:00:00:00:02 | H2 | 0 | 1.2.3.5 |
| H3P0 | XX:00:00:00:00:00:00:03 | H3 | 0 | 1.2.3.6 |

| S1P0 | ZZ:00:00:00:00:00:00:01 | S1 | 0 | 2.2.3.4 |
|------|-------------------------|----|----|---------|
| S1P1 | ZZ:00:00:00:00:00:00:02 | S2 | 1 | 2.2.3.5 |

METHOD FOR CONNECTING COMPUTER SYSTEMS

BACKGROUND OF THE INVENTION

The present invention relates to a utility program to manage security between a storage device and a computer, and in particular, to a method of implementing a utility program and an operation method thereof in which security can be managed without considering methods of setting a security function supported by a storage device, a security function supported by a computer, and a security function supported by a switching device (connecting device), respectively.

The connection most employed between a computer and an external storage device are changing from a connection layout in which the storage device exclusively belongs to the computer to a storage network layout in which a plurality of computers are connected via a network to a plurality of storage devices. One of such storage network layouts in which a fibre channel is used as a connecting medium between the computer and the storage is particularly known as "storage area network (SAN)".

The SAN uses connecting devices called "fabric switch" or "a fibre channel switch". The fabric switch is a device including a plurality of fibre channel ports. By connecting computers and storage devices via fibre channel cables to ports of the fibre channel switch, the computer and storage devices can communicate with each other. By connecting the fabric switches via a fibre channel cable to each other, computers and storage devices connected to the SAN can communicate via a plurality of fabric switches with each other.

The devices such as storage devices and computers constituting the SAN will be referred to as nodes hereinbelow. Each node includes at least one port to be connected to the SAN and is connected via a fibre channel cable to a fibre channel switch.

All nodes connected to the SAN can communicate with each other as described above. Therefore, a plurality of computers connected to the SAN can access any areas of the storage devices connected to the SAN. In general, it is assumed that an operating system running in each computer exclusively use a storage area, and it is not considered that the storage area can be accessed by other computers. Therefore, there possibly occurs, for example, a case in which when two or more computers write data in one storage area of the SAN, first data written first in the storage area is by mistake lost by a subsequent writing operation in the storage area.

As above, the property of the SAN easily causes hindrance to the operating system. There also exists a program product which uses the property of the SAN so that a plurality of computers share the storage area. The system manager must manage the programs such that a plurality of computers simultaneously access one storage area excepting when such a program product described above is used.

To easily solve this problem, the fabric switch generally supports a function called "zoning". The zoning function is used to classify the ports of the nodes connected to the fabric switch into groups so that only the computers belonging to a zone can access the storage devices belonging to the zone. To set a zone, a value called "worldwide name (WWN)" which is a unique identifier assigned to a port is used. The SAN manager sets worldwide names of storage devices and zones which contain worldwide names of computers allowed to access the storage devices to the fabric switch so that the computers access only the storage devices set as above.

Incidentally, one port can belong to a plurality of zones. In this case, the port can mutually communicate with the ports contained in all zones to which the port belongs.

On the other hand, the access limiting function may be supported by an external storage device. A function called "logical unit number (LUN) security" or "LUN masking" is used to limit, by use of a worldwide name, computers which can access storage areas in storage devices. A logical unit number is an 8-bit value assigned to a storage area and is defined by small computer system interface (SCSI) specifications used as a communication protocol of the SAN. A computer specifies a logical unit number in the SCSI protocol to conduct communication via a fibre channel with a storage device to thereby access a particular storage area.

However, if an LUN security has been set to the storage area, the storage device makes a check using a worldwide name to determine whether or not the access is issued from a computer allowed to access the storage area. If the computer (WWN) is not allowed to access the storage area, the storage device rejects the access. In this specification, a storage area will be referred to as a logical unit according to the definition of SCSI.

There exists a method in which the LUN security function is supported or provided by a device driver of a fibre channel host bus adapter installed in a computer. In this method, the device driver of the fibre channel host bus adapter limits an access to a logical unit by concealing the logical unit of an SAN specified for the operating system. The device driver of the fibre channel host bus adapter having the function includes an interface to set the LUN security.

The zoning function and the LUN security function are mutually independent of each other. Therefore, to change setting of the zoning and the setting of the LUN security, the manager must respectively operate the fabric switches and the storage devices and the computers connected to the fabric switches. This disadvantageously takes a long period of time.

To limit the access in the storage area network, the access restriction of the zoning function and that of the LUN security must integrally match each other. For example, even if the manager sets the LUN security to allow a computer access a logical unit, when the zoning function inhibits the computer from accessing the logical unit, the computer cannot access the logical unit. This possibly leads to a fatal event in which the system including the storage area network stops. In the prior art, since the zoning function and the LUN security function are independent of each other, there exists possibility of such inconsistent setting of these functions as described above.

SUMMARY OF THE INVENTION

It is therefore an object of the present invention, which has been devised to remove the problem, to provide a utility program and an operation method thereof in which the user can set the zoning function and the LUN security function, without paying attention to two security levels respectively of these functions, in one graphical user interface (GUI) screen without causing any inconsistency between these functions.

To achieve the object according to the present invention, in a computer system comprising computers, storage devices, and a switch unit (connection means) including a fibre channel and the like, management means for managing connection in said computer system includes connection display means for displaying a state of connection in said computer system and input means for changing the connection. Said connection state display means can display computers, storage devices, and the connection state in a graphic image, and an area can be created by use of said input means. Moreover, there are also disposed display position comparing means for comparing a graphic image display position of said graphic image of said computers and said storage devices in said connection state display means with a graphic image display position of an area created by use of said input means and setting means for setting said storage devices and said switch unit according to a result of the comparison by said display position comparing means. The setting means is so configured to set computers according to necessity.

Additionally, to create an area by the input means, it is possible to create the area overlapped with other areas. The position and the size of the area as well as the position of a graphic image representing computers and storage devices can be changed by the input means.

Moreover, the display position comparing means includes processing to verify an actual relationship of connections between the switch unit, storage devices, and computers according to the displayed area and a positional relationship between graphic images of the computers and storage devices contained in the area.

BRIEF DESCRIPTION OF THE DRAWINGS

The present invention will be more apparent from the following detailed description, when taken in conjunction with the accompanying drawings, in which:

FIG. 11 is a diagram showing a table of symbols shown in FIG. 8;

FIG. 12 is a diagram showing a table of areas shown in FIG. 8;

FIG. 13 is a diagram showing a table to keep a relationship between the areas and the symbols shown in FIG. 8;

FIG. 14 is a diagram showing a table to keep a relationship between the areas and zones shown in FIG. 8;

FIG. 15 is a diagram showing a table to keep a relationship between logical unit symbols and storage device port symbols shown in FIG. 8;

FIG. 16 is a diagram showing a table of computer ports;

FIG. 17 is a diagram showing a table of storage device ports;

DESCRIPTION OF THE EMBODIMENTS

Figure 1:
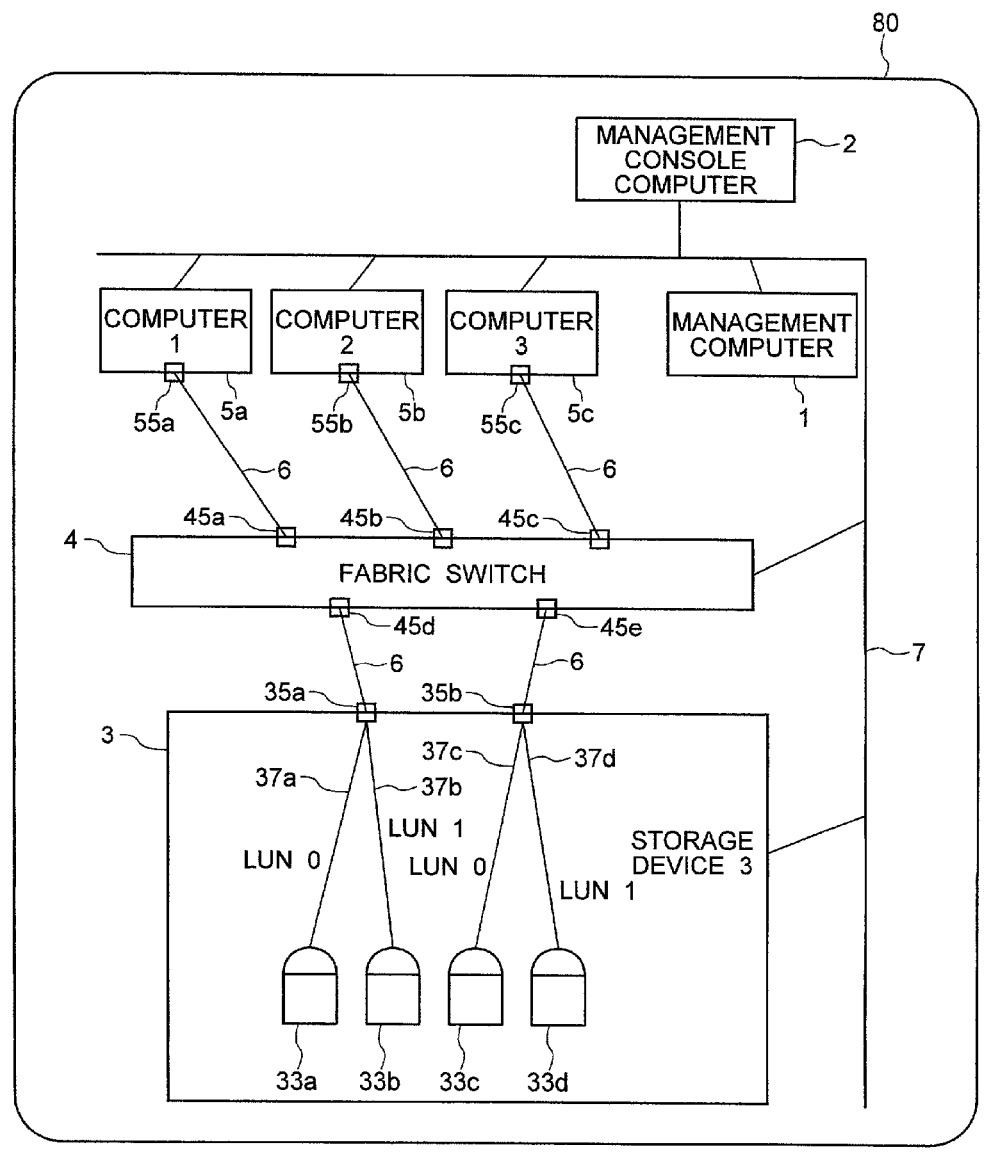
FIG. 1 is a block diagram showing a configuration of a computer system.

FIG. 1 shows a configuration of a computer system 80 as an object of management in a favorable embodiment according to the present invention.

The computer system 80 includes a management computer 1 to manage the computer system 80, a management console computer 2 for a user to operate the management computer 1, a storage device 3 having an LUN security function, a fabric switch 4, a computer 5 using the storage device 3, fibre channels 6, and a communication unit 7 for the management computer 1 to communicate with the management console computer 2, the storage device 3, and the fabric switch 4. The storage device 3 includes logical units 33*a* to 33*d*. The storage device 3 also includes fibre channel ports 35*a* and 35*b*. The logical units 33*a* and 33*b* can be accessed as LUN0 and LUN1 respectively via paths 37*a* and 37*b* in the storage device 3 from the fibre channel port 35*a*. The logical units 33*c* and 33*d* can be accessed as LUN0 and LUN1 respectively via paths 37*c* and 37*d* in the storage device 3 from the fibre channel port 35*b*. The fabric switch 4 includes fibre channel ports 45*a* to 45*e*. The fibre channel port 45*d* is connected via a fibre channel cable 6 to the fibre channel port 35*a* of the storage device 3. The fibre channel port 45*e* is connected via a fibre channel cable 6 to the fibre channel port 35*b* of the storage device 3. The computers 5*a* to 5*c* respectively include fibre channel ports 55*a* to 55*c*. The fibre channel ports 55*a* to 55*c* are respectively connected via fibre channel cables 6 to the fibre channel ports 45*a* to 45*c* of the fabric switch 4.

In the description below, the computers 5*a* to 5*c* will be simply and representatively referred to as computers 5.

In the embodiment, it is assumed that the communication unit 7 is configured for a connection layout of network type such as a local area network or the internet. However, it is only necessary that the management computer 1 includes the management console computer 2, the storage device 3, the fabric switch 4, and the communication unit for the client computers 5. That is, the communication unit 7 is not limited to the connection layout of network type. For example, when the management computer 1 includes a fibre channel port like the fabric switch 4 and is connected via the fibre channel port to the fabric switch 4, it is also possible to use the fibre channels 6 to conduct the function of the communication unit 7 for the storage device 3, the fabric switch 4, and the computer 5. The management computer 1 may also be connected via a serial cable to the fabric switch 4 or the storage device 3 such that the management computer 1 uses the serial cable as a communication unit to operate the fabric switch 4 or the storage device 3. The management computer 1 and the management console computer 2 may be implemented by one computer. Or, the management computer 1 and the management console computer 2 may be included in each of the computers 5. Although the storage device 3 is only one storage device in the embodiment, the present invention is applicable also to a computer system including a plurality of storage devices.

Figure 2:
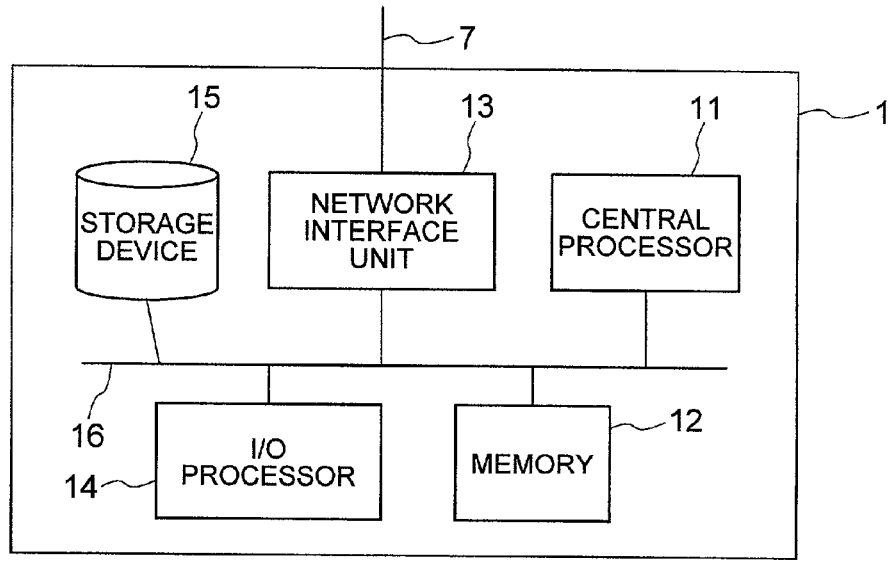
FIG. 2 is a block diagram showing a configuration of a management computer.

FIG. 2 shows a configuration of the management computer 1.

The management computer 1 includes a central processor 11 to control the management computer 1, a memory 12 to store programs to be executed by the central processor 11 and data associated therewith, a network interface unit 13 to conduct communication via the communication unit 7, an input/output (I/O) processor 14 for the user to operate the management computer 1, a storage device 15 such as a hard disk device to store programs to be executed by the central processor 11 and data associated therewith, and a bus 16 to connect the constituent elements 11 to 15 of the computer 1 to each other. Although not shown in FIG. 2, the I/O processor 14 is connected to a display to present information to the user and a keyboard and a pointing device such as a mouse for the user to input data to the computer 1.

Figure 3:
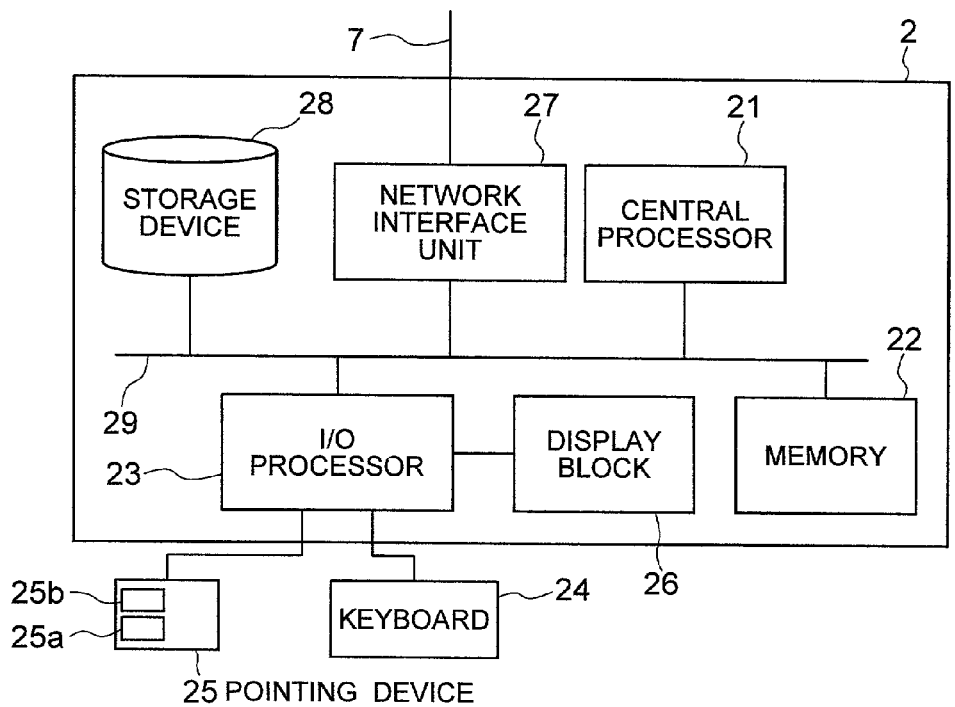
FIG. 3 is a block diagram showing a configuration of a management console computer.

FIG. 3 shows a configuration of the management console computer 2.

The management console computer 2 includes a central processor 21 to control the computer 2, a memory 22 to store programs to be executed by the central processor 21 and data associated therewith, an I/O processor 23 for the user to operate the computer 2, a keyboard 24 connected to the I/O processor 23, a pointing device such as a mouse connected to the I/O processor 23, a display 26 connected to the I/O processor 23, a network interface unit 27 to conduct communication via the communication unit 7, a storage device 28 such as a hard disk device to store programs to be executed by the central processor 21 and data associated therewith, and a bus 29 to connect the constituent elements 21, 22, 23, 27 and 28 of the computer 2 to each other.

Figure 4:
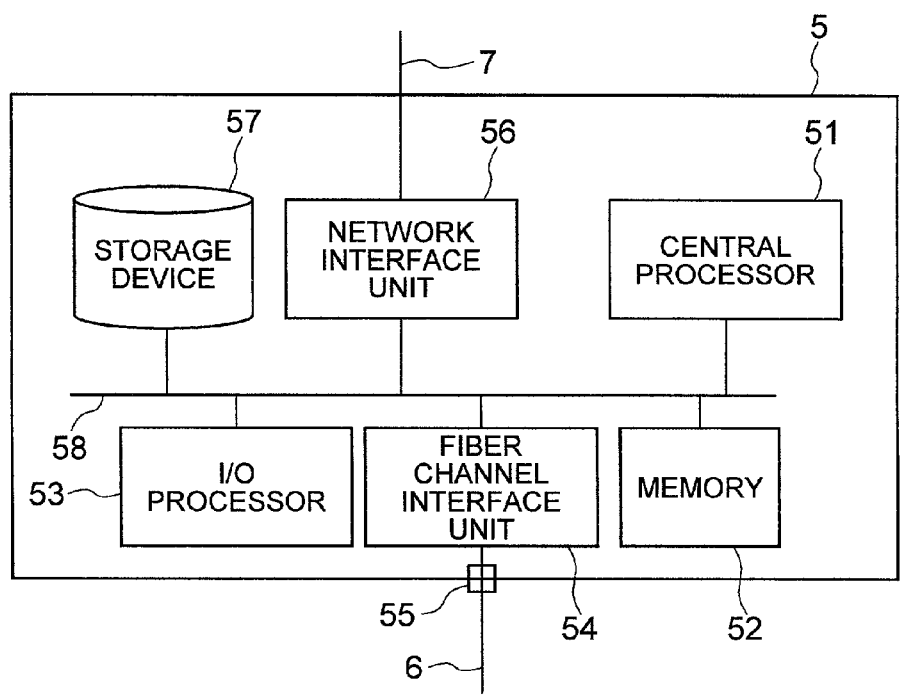
FIG. 4 is a block diagram showing a configuration of a computer to access a logical unit.

FIG. 4 shows a configuration of the computers 5a to 5c representatively referred to as computers 5.

The computer 5 includes a central processor 51 to control the computer 5, a memory 52 to store programs to be executed by the central processor 51 and data associated therewith, an I/O processor 53 for the user to operate the computer 5, a fibre channel interface unit 54, a fibre channel port 55, a network interface unit 56 to conduct communication via the communication unit 7, a storage device 57 such as a hard disk device to store programs to be executed by the central processor 51 and data associated therewith, and a bus 58 to connect the constituent elements 51 to 54 and the constituent elements of the computer 2 to each other.

Figure 5:
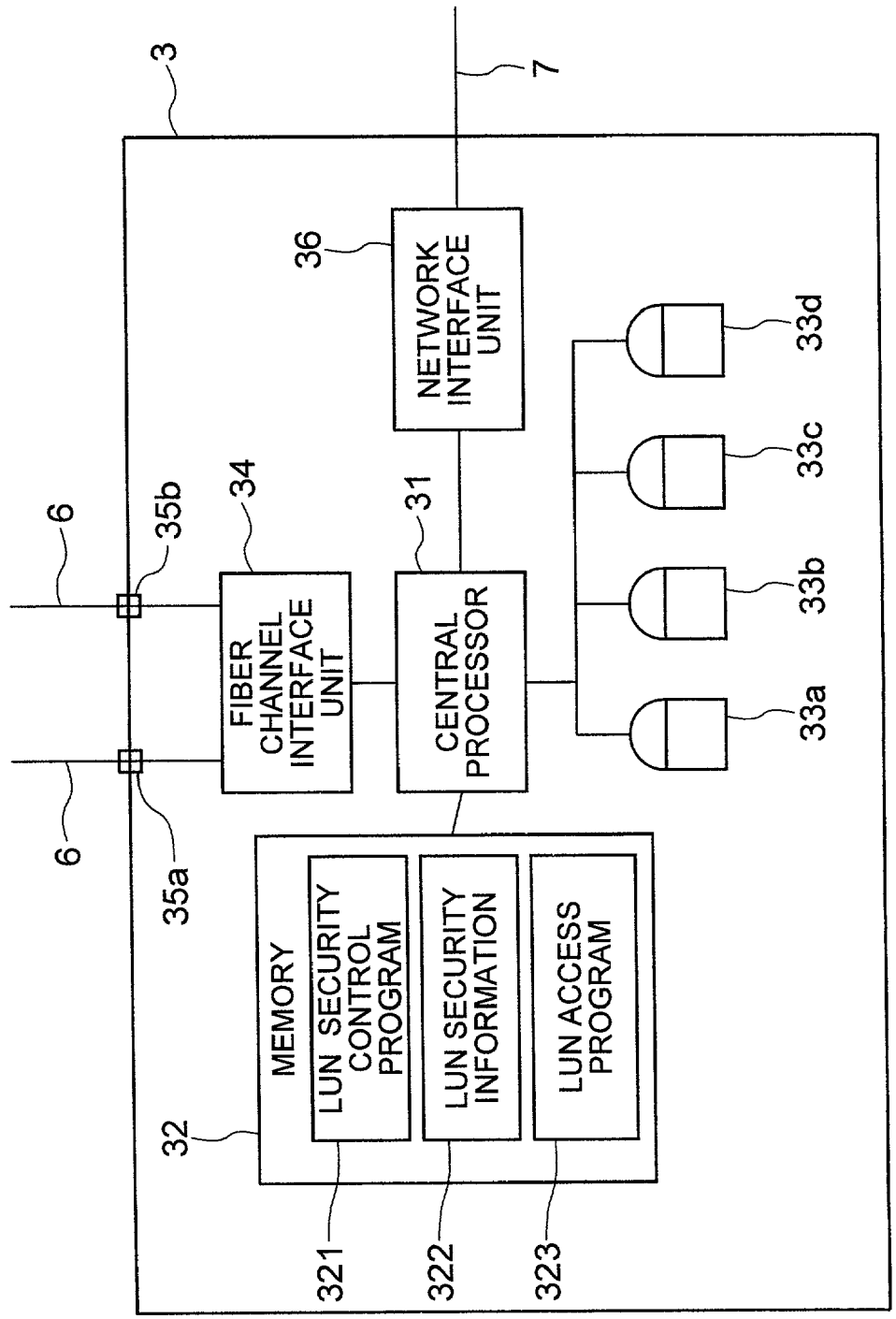
FIG. 5 is a diagram showing a configuration of a storage device.

FIG. 5 shows a configuration of the storage device 3.

The storage device 3 includes a central processor 31 to control the storage device 3, a memory 32 to store programs to be executed by the central processor 31 and data associated therewith, logical units 33a to 33d disposed in the storage device 5, a fibre channel interface unit 34, fibre channel ports 35a and 35b, and a network interface unit 36 to conduct communication via the communication unit 7.

The memory 32 has stored a program 321 to control the LUN security, LUN security information 322 to keep information regarding LUN and access control, and a program 323 to process an access from a computer to an LUN.

Figure 6:
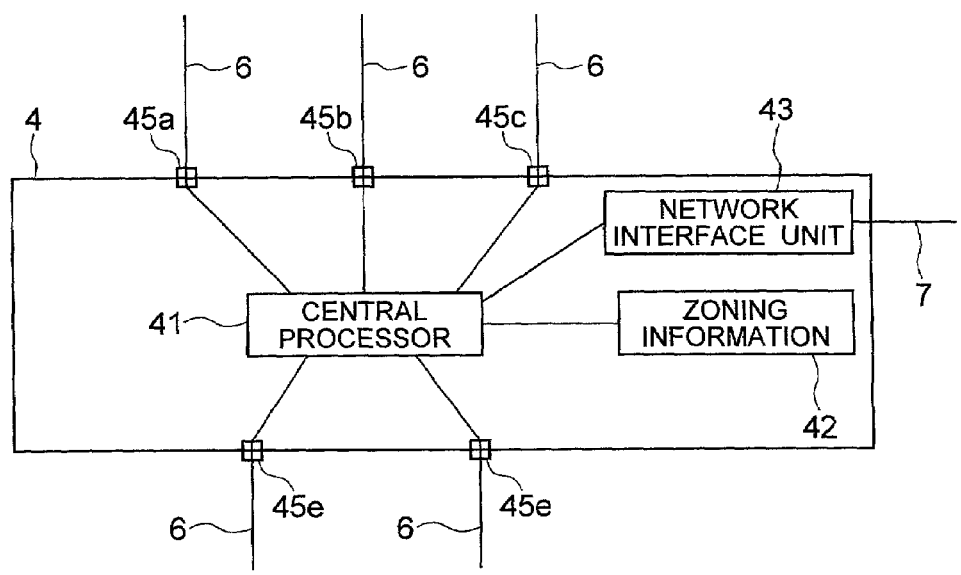
FIG. 6 is a diagram showing a configuration of a fabric switch.

FIG. 6 shows a configuration of the fabric switch 4.

The fabric switch 4 includes fibre channel ports 45a to 45e, a central processor 41 to control setting of zones and data passing through the fibre channel ports 45a to 45e, a zoning information 42 to be used by the central processor 41, and a network interface unit 43 connected to the communication unit 7.

Figure 7:
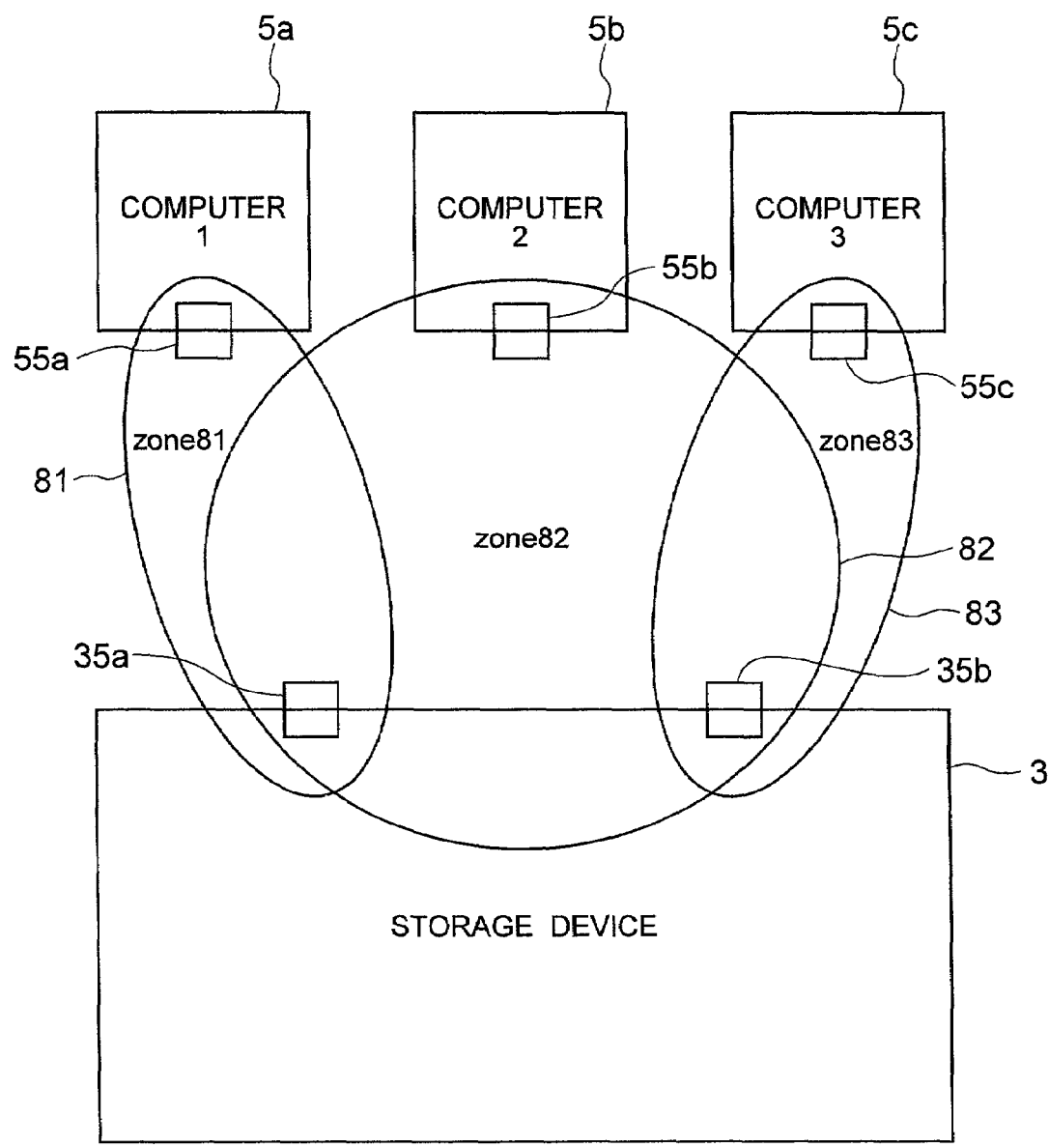
FIG. 7 is a diagram showing a relationship between zones set by a zoning setting operation.

FIG. 7 shows zones set in a computer system 80. In FIG. 7, three zones are set to the fabric switch 4. The zones are a zone 81 with an identifier "zone81" in which the fibre channel port 55a of the computer 5a can mutually communicate with the fibre channel port 35a of the storage device 3, a zone 82 with an identifier "zone82" in which the fibre channel port 55b of the computer 5b, the fibre channel port 35a of the storage device 3, and the fibre channel port 35b of the storage device 3 can mutually communicate with each other, and a zone 83 with an identifier "zone83" in which the fibre channel port 55c of the computer 5c can mutually communicate with the fibre channel port 35b of the storage device 3.

Figure 8:
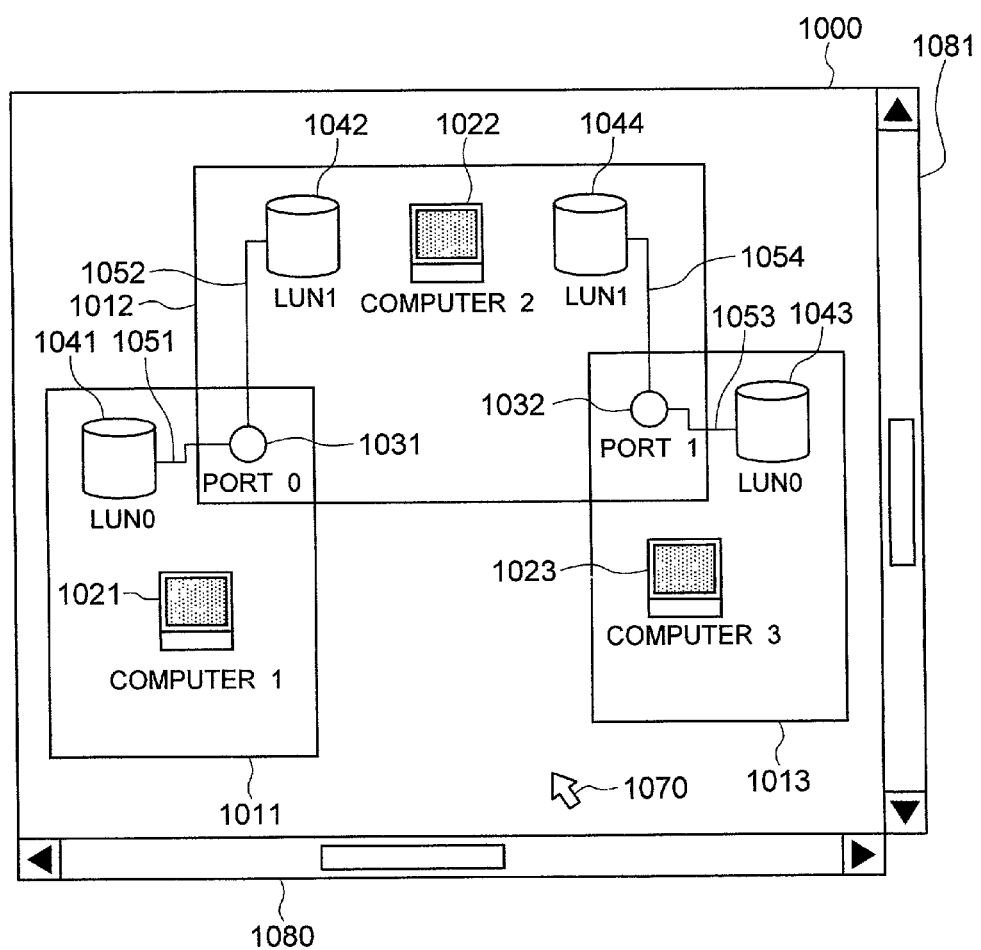
FIG. 8 is a diagram showing a display example on a display of a management console computer.

FIG. 8 shows a configuration of a screen 1000 presented on the display 26 of the management console computer 2 in the embodiment.

The screen 1000 shows a configuration of the access restriction of the computer system 80 shown in FIGS. 1 and 7 in the embodiment. The screen 100 is displayed in the overall screen or in a part of the screen of the display 26 of the computer 2. In the screen 1000, scroll bars 1080 and 1081 are displayed respectively on a right end section and a lower end section thereof. By operating the scroll bars 1080 and 1081, the user can scroll the screen image in the screen 100 to display continuous parts of the screen image being presently displayed.

Numerals 1021 to 1023 are computer port symbols respectively indicating the fibre channel ports 55a to 55c respectively of the computers 5a to 5c. For easy understanding of the configuration, it is assumed in this embodiment that one computer 5 includes one port and the symbol is indicated by an icon similar to the form of a computer. Naturally, this will not restrict the fields to which the present invention is applied.

Numerals 1031 and 1032 are storage device port symbols respectively indicating the ports 35a and 35b of the storage device 3. For easy understanding, each port of the storage device 3 is indicated by a small circle in the embodiment.

Numerals 1041 to 1044 are logical unit symbols respectively indicating the logical units 33a to 33d arranged in the storage device 3.

Lines 1051 to 1054 respectively indicate paths set between the ports 35a and 35b of the storage device 3 and the logical units 33a to 33d. Lines 1051 and 1052 respectively indicate that the logical units 33a and 33b can be accessed from the port 35a. Lines 1053 and 1054 respectively indicate that the logical units 33c and 33d can be accessed from the port 35b.

Areas 1011 to 1013 are displayed in the screen 1000. These areas respectively indicate ranges of access restriction, which will be described later. The areas 1011 to 1013 respectively correspond to zones 81 to 83 allocated to the computer system 80. Each area is expressed by a rectangle on the screen 1000. However, any contour other than the rectangle can be used to express the area without departing from the gist of the present invention. Therefore, although only a rectangular area is used for simplification of the description, the applicable range of the present invention is not restricted by the embodiment.

A cursor 1070 is moved in the screen 1000 in response to an operation of the pointing device 25 by the user.

The use can move the computer port symbol, the storage device port symbol, the logical unit symbol, and the symbol indicating a storage device on the screen 1000 by conducting a drag-and-drop operation. Specifically, the user places the cursor over a target symbol by operating the pointing device 25, depresses a button 25a of the pointing device 25, moves the cursor 1070 with the button 25a kept depressed to a desired position, and then releases the button 25a. Resultantly, the symbol is moved to the desired position. However, the destination of each symbol is restricted, which will be described later. The user can change the size and the position of each area by operating the pointing device 25.

Figure 9:
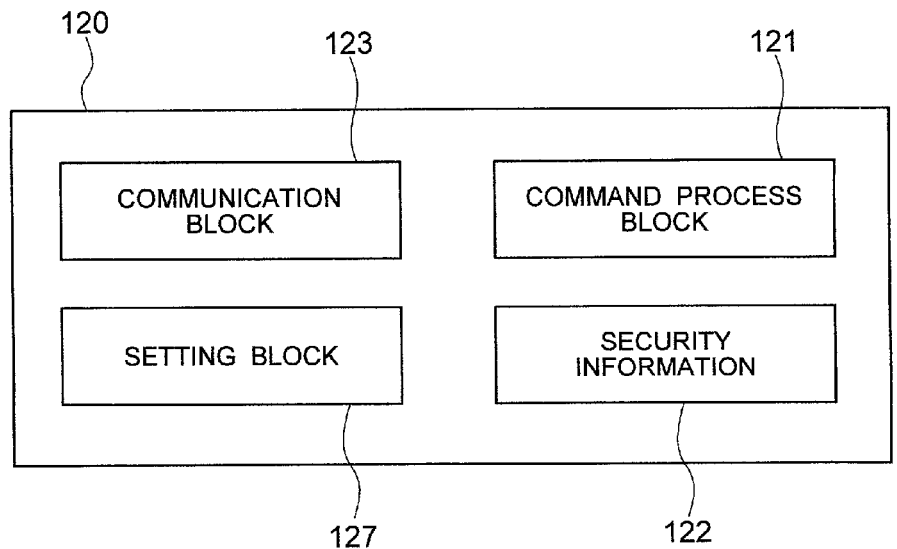
FIG. 9 is a diagram showing a layout of a management program.

FIG. 9 is a layout of a management program 120 to run on the management computer 1. The management program 120 includes a command process block 121 which interprets a user's operation sent from a management console program 220, which will be described later, and which accordingly instructs a setting block 127 to change the setting of a device to thereby change security information 122 as internal data, security information 122 to keep areas and symbols to be displayed on the screen 1000, a communication block 123 to communicate with the management console computer 2, and a setting block 127 to change the setting of the storage device 3, the fabric switch 4, and the computers 5.

In the embodiment, the computer system 80 as a target system includes only one fabric switch 4. However, the present invention is applicable to a computer system including a plurality of fabric switches by arranging in the setting block 127 an operation unit to operate the fabric switches.

Figure 10:
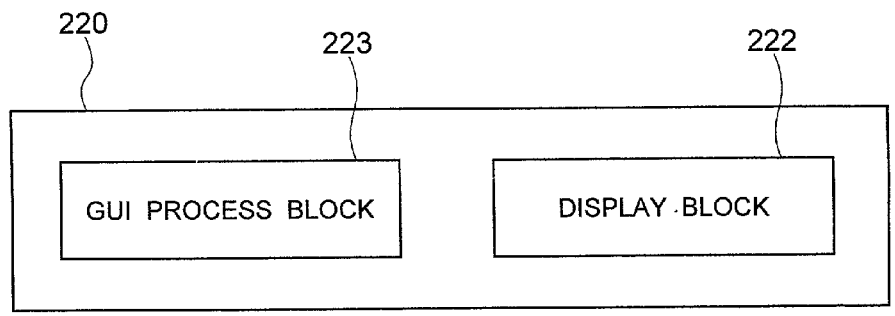
FIG. 10 is a diagram showing a layout of a management console program.

FIG. 10 shows a configuration of the management console program 220 to run on the management console computer 2. The management console program 220 includes a display block 222 to draw the screen 1000 on the display 26 of the computer 2 and a GUI process block 223 to process operations conducted by the user from a keyboard 24 and the pointing device 25 of the computer 2.

Description will next be given of tables 3100 to 3900 contained in the security information 122 as internal data of the management program 120.

FIG. 11 shows the table 3100 to keep a correspondence between symbols to be displayed on the screen 1000 and management target objects. A first item of each row of the table 3100 is an identifier of a symbol. The symbol identifier is uniquely assigned to the symbol and is used to indicate the symbol between the management program 120 and the management console program 220. A second item of the row indicates coordinate values and a size of the symbol on the screen 1000. A third item is a name of the symbol to be displayed below the symbol on the screen 1000. A fourth item is a type of a system constituent element expressed by the symbol. HOST_PORT indicates a port of a computer, STORAGE_PORT indicates a port of a storage device, and LU indicates a logical unit. A fifth item is an identifier in the management program 120 of a system constituent element expressed by the symbol. In the table 3100, the first to fifth rows keep information respectively of the symbols 1021, 1022, 1023, 1031, and 1032. Sixth to ninth rows keep information respectively of the symbols 1041 to 1044.

FIG. 12 shows the table 3200 to keep ranges and validity of areas to be displayed on the screen 1000. In each row of the table 3200, a first item is a value of an identifier of the area. The area identifier is a value uniquely assigned to the area and is used to indicate the area between the management console program 220 and the management program 120. A second item indicates a range of the area by two pairs of coordinate values respectively of an upper-left corner and a lower-right corner of the area on the screen 1000. A third item is a name assigned to the area for the user to identify the area. A fourth item is a validity flag to indicate validity of the area. The validity of the area will be described later. When the validity flag has a value of "1", the area identified by the identifier in the first item is valid. When the flag has a value of "0", the area is invalid. The first to third rows of the table 3200 keep information of the areas 1011 to 1013, respectively.

FIG. 13 shows the table 3300 to keep a relationship between the areas and the symbols in the areas on the screen 1000. In each row of the table 3300, a first item is an identifier of the area and has a value equal to that of the first item of the table 3200. A second item is an identifier of a symbol arranged in the area identified by the identifier of the first item and has a value equal to that of the first item of the table 3100. The first to third rows of the table 3300 indicate that the area 1011 includes the symbols 1021, 1031, and 1041, respectively. The fourth to eighth rows of the table 3300 indicate that the area 1012 includes the symbols 1022, 1031, 1042, and 1043, respectively. The ninth to 11th rows of the table 3300 indicate that the area 1013 includes the symbols 1023, 1033, and 1044, respectively.

FIG. 14 shows the table 3500 to store a correspondence between zones set to the fabric switch 4 and areas on the screen 1000. In each row of the table 3500, a first item is a value as an identifier to indicate a zone between the management console program 220 and the management program 120. A second item is an identifier of the area and has a value equal to that of the first item of the table 3200. A third item is a value as an identifier of a zone when the fabric switch 4 is operated. The value is described in a format associated with the fabric switch 4. The first row of the table 3500 indicates that the area 1011 corresponds to the zone 81. The second row of the table 3500 indicates that the area 1012 corresponds to the zone 82. The third row of the table 3500 indicates that the area 1013 corresponds to the zone 83.

FIG. 15 shows the table 3600 to keep, when logical units of the computer system 80 has paths to storage device ports, a relationship between the logical unit symbols of the logical units and the storage device port symbols of the storage device ports. In each row of the table 3600, a first item is an identifier of the logical unit symbol and has a value equal to that of the first item of the table 3100. A second item is an identifier of a symbol indicating a port having a path to the logical unit and has a value equal to that of the table 3100. A third item is a logical unit number (LUN).

The first row of the table 3600 indicates that the logical unit 33a indicated by the logical unit symbol 1041 has a path to the storage device port 35a indicated by the storage device port symbol 1031 and the logical unit 33a has a logical unit number of "0". The third row of the table 3600 indicates that the logical unit 33b indicated by the logical unit symbol 1042 has a path to the storage device port 35a indicated by the storage device port symbol 1031 and the logical unit 33b has a logical unit number of "1". The second row of the table 3600 indicates that the logical unit 33c indicated by the logical unit symbol 1043 has a path to the storage device port 35b indicated by the storage device port symbol 1032 and the logical unit 33c has a logical unit number of "0". The fourth row of the table 3600 indicates that the logical unit 33d indicated by the logical unit symbol 1044 has a path to the storage device port 35b indicated by the storage device port symbol 1032 and the logical unit 33d has a logical unit number of "1".

FIG. 16 shows the table 3800 to keep all computer ports of the computer system 80. In each row of the table 3800, a first item is a value as a port identifier to indicate a port between the management console program 220 and the management program 120. A second item is a worldwide name of the computer port identified by the first item. A third item is an identifier of the computer having the port identified by the identifier of the first item. The identifier has a unique value associated with the computer for use in the management program 120. A fourth item is an identifier number (0, 1, 2, . . . ) of the port identified by the value of the first item, the identifier being used in the computer identified by the value of the third item. In this embodiment, since the computer includes only one port, "0" is set to the third item. A fifth item is an identifier address in the communication unit 7 in the communication unit 7 for the management program 120 to communicate via the communication unit 7 with the computer having the port. Since the communication unit 7 is configured for a network using transmission control protocol (TCP)/internet protocol (IP) in the embodiment, an IP address of the computer is set as the value of the fifth item.

The first to third rows of the table 3800 respectively keep information of computer ports indicated by the symbols 1021 to 1023, respectively.

FIG. 17 shows the table 3900 to keep all storage device ports of the computer system 80. In each row of the table 3900, a first item is a value as a port identifier to indicate a port between the management console program 220 and the management program 120. A second item is a worldwide name of the storage device port. A third item is an identifier of the storage device having the port identified by the identifier of the first item. The identifier has a unique value associated with the storage device for use in the management program 120. A fourth item is an identifier of the port identified by the value of the first item, the identifier being used in the computer identified by the value of the third item. The value of the fourth item is used to specify the port to the storage device. Therefore, the value is described in a format depending on the storage device. A fifth item is an identifier address in the communication unit 7 for the management program 120 to communicate via the communication unit 7 with the storage device having the port. Since the communication unit 7 is configured for a network using TCP/IP in the embodiment, an IP address of the computer is set as the value of the fifth item.

The first row of the table 3900 keeps information of the storage device port corresponding to the symbol 1031. The second row of the table 3900 keeps information of the storage device port corresponding to the symbol 1032.

The display block 222 refers to the table 3200 and draws the areas 1011 to 1013 according to the coordinate values and the validity flag of each row. The display block 222 refers to the table 3100 and then draws the computer port symbols 1021 to 1023, the storage device symbols 1031 an 1032, and the logical unit symbols 1041 to 1044 according to the coordinate values, the symbol type, and the symbol name of each row. Finally, the display block 222 refers to the table 3600 and then draws the paths 1051 to 1054 between the logical unit symbols and the storage device port symbols.

To display the screen 1000, the management console program 220 refers to the tables 3100, 3200, and 3600 as above. However, the management console program 220 may obtain these tables from the management program 120 when the management console program 220 draws the screen 1000. Or, the management console program 220 may have the same tables as those of the management program 120. This also applies to the security information 122 kept by another management program 120.

The screen 1000, the security information 122 as internal data of the management program, and a correspondence therebetween are as follows. Description will now be given of meanings and validity of the areas 1011 to 1013 displayed on the screen 1000. A valid state of an area and an invalid state thereof are criteria introduced for the management program 120 to determine whether or not mismatching exists between an operation conducted by the user for the screen 1000 and a configuration which can be set to the system.

In the description below, when a symbol is arranged in an area on the screen 1000, it is assumed that the symbol belongs to the area. This state is also referred to as "the area contains the symbol" depending on cases.

In the embodiment, an area is in a valid state or in an invalid state. An area in the valid state is called a valid area, and an area in the invalid state is called an invalid area. The invalid area is displayed in a color different from a color of the valid area on the screen 1000.

When there exists a valid area containing a plurality of port symbols, it is indicated that the symbols in the area can mutually communicate with associated ports, and these ports can communicate with each other in the computer system 80. The ports include computer ports and storage device ports. When a plurality of ports can communicate with each other, the fabric switch 4 sets a zone containing the ports.

In the embodiment, for a valid area containing two or more ports, there exists a zone corresponding to the valid area in any situation. As described above, the correspondence between the valid area and the zone is recorded in the table 3500. When one valid area contains a plurality of port symbols, it is assumed that connectivity exists between the port symbols. Also, it is assumed that connectivity exists between ports indicated by the port symbols, respectively.

When there exists a valid area containing computer symbols and logical unit symbols, it is indicated that for the logical units indicated by the logical unit symbols can be accessed from the computer ports using the LUN security function, and actually, the logical units can be accessed from the computer ports in the computer system 80.

In the description below, when there exists a valid area containing computer symbols and logical unit symbols, it is assumed that the computer port symbols can access the logical unit symbols on the screen. Also, the computer ports indicated by the computer port symbols can access the logical units indicated by the logical unit symbols.

The areas can overlap with each other. When a plurality of overlapped valid areas contain a symbol, an actual port or logical unit indicated by the symbol has the above meaning for all valid areas in which the symbol is arranged.

As above, an area indicates a group including accessible constituent elements indicated by the symbols.

An invalid area represents a system configuration which the user intentionally sets as "invalid" or an inconsistent system configuration. For example, assume that the user intentionally invalidates an area containing a logical unit symbol and a computer port symbol. In response to the user's operation, the management program 120 changes the configuration of the computer system (assume that the areas do not overlap each other in this case) such that the computer port indicated by the computer port cannot access the logical unit indicated by the logical unit symbol. Processing in this case will be described later. When an area contains a logical unit symbol and a computer port symbol, the area is an invalid area if connectivity exists between the storage device port symbol having a path to the logical unit symbol and the computer port symbol. This will be described by referring to FIGS. 18A to 18C.

Figure 18A:
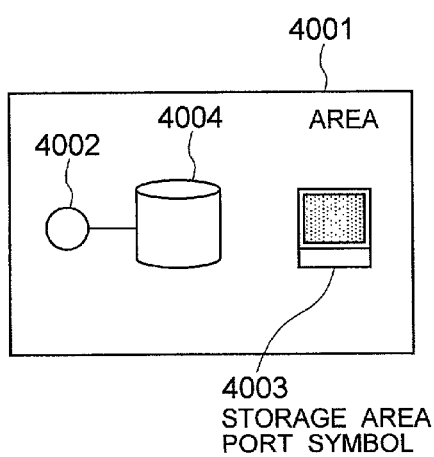
FIGS. 18A to 18C are diagrams partially showing other display examples on the display of FIG. 3.
Figure 18B:
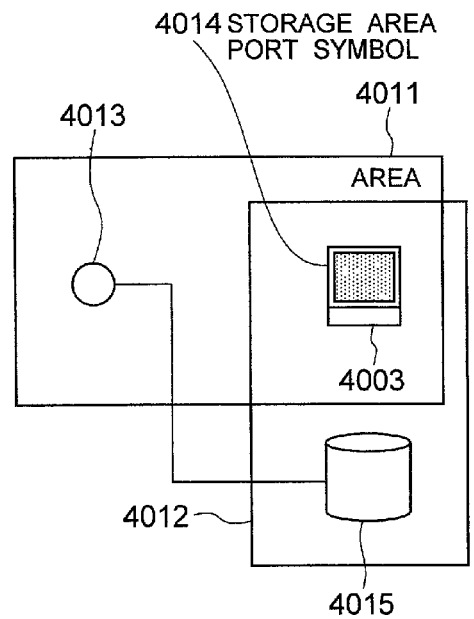
Figure 18C:
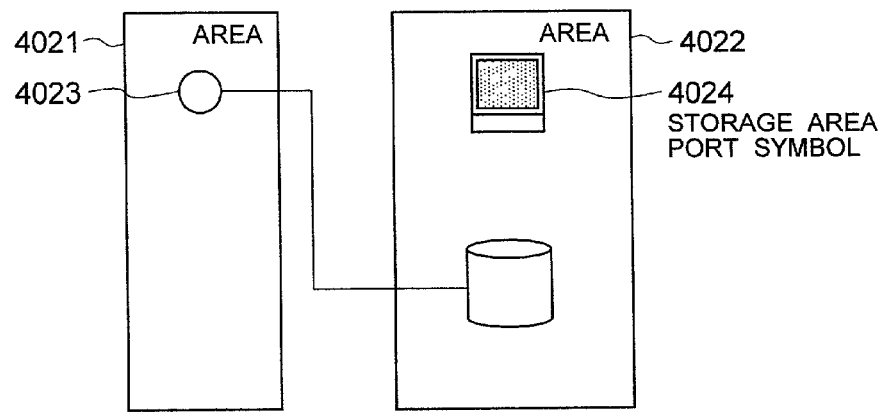

In the case of FIG. 18A, an area 4001 guarantees connectivity between a storage device port symbol 4002 having a path to a logical unit symbol 4004 and a computer port symbol 4003. Therefore, the area 4001 containing the logical unit symbol 4004 and the computer port symbol 4003 is valid by itself. In the case of FIG. 18B, when an area 4011 is valid, the area 4011 guarantees connectivity between a storage device port symbol 4013 and a computer port symbol 4014, and hence an area 4012 is valid. However, in the case of FIG. 18C, connectivity is absent between a storage device port symbol 4023 and a computer port symbol 4024, and hence an area 4022 is invalid, but an area 4021 is valid.

It is one of the objects of the present invention to avoid inconsistent setting of devices. Therefore, when either one of the areas becomes invalid on the screen 1000 as a result of influence from a user's operation, the operation is regarded as invalid. However, there exists an exceptional case of operation of the user to generate an area. In this case, the user can initialize an invalid area. The invalid area thus generated does not influence the other area.

Even when an invalid area becomes a consistent area, i.e., a valid area as a result of influence from a user's operation, the management program 120 does not automatically validate the area. An invalid area remains invalid up to a point of time when the user explicitly validates the invalid area. The invalid area can be validated from a menu or the like through a screen operation. For example, the user selects an invalid area and then conducts an operation to select "validate" from a menu, then the invalid area is validated to a valid area.

As above, whether an area is in a valid state or in an invalid state is recorded in the fourth item of the area control table 3200 in the security information 122. If the area is invalid, a value of "0" indicating "invalid" is recorded in the fourth item. If the area is valid, a value of "1" indicating "valid" is recorded in the fourth item.

Description has been given of the constituent elements of the embodiment, namely, the computer system 80, the screen 100 to be displayed on the display 26 of the management console computer 2, the security information 122 as internal data of the management software 129, and the valid and invalid areas. Next, description will be given of a method in which the embodiment supports, by use of the constituent elements, an access restriction setting function to restrict a user from accessing the computer system 80.

In the embodiment, the management program 120 provides via the screen 1000 three function regarding the computer system access restriction to the user (typically, the computer system manager). The functions are (1) generation and deletion of a zone, (2) change of a port contained in a zone, and (3) allocation of a logical unit to a computer by the LUN security. Details thereof are as follows.

(1) To generate a zone, the user generates an area on the screen 1000 and then moves in the area by a pointing device 25 a symbol of a storage device port and a symbol of a computer port to be added to a new zone to be created. To delete a zone, the user delete an area corresponding to the zone by a menu operation.

(2) To add a new computer port or a new storage device port to an existing zone, the use moves by the pointing device 25 a symbol indicating the desired computer or storage device port to a position in a desired area. To remove a computer port or a storage device port from a zone, the use moves by the pointing device 25 a symbol indicating the desired computer or storage device port to a position outside the areas corresponding to the zone.

(3) To allocate a new logical unit to a computer, the user moves by the pointing device 25 a desired logical unit symbol to a position in an area containing a computer port symbol. Or, the user moves by the pointing device 25 a symbol indicating a desired computer port to a position in an area containing a logical unit symbol. Conversely, to release the allocation of a logical unit to a computer, the user moves a symbol indicating a logical unit to a position outside an area containing a symbol indicating a computer port. Or, the user moves a symbol indicating a computer port to a position outside an area containing a symbol indicating a logical unit.

In response to the operation of the user, the management program 120 interprets the contents of the operation and then changes the setting of the zones and the setting of the LUN security in the computer system 80. In the management program 120, the command process block 121 interprets the contents of the operation. To reflect the interpreted contents of the user's operation in the computer system 80, the command process block 121 uses eight procedures of the setting block 127 as below. In the embodiment, a procedure indicates a program routine which conducts a sequence of processing according to specified parameters and produces results of the processing.

A procedure AddAllowedHosts receives as parameters an identifier of one logical unit and an identifier of at least one computer port and appropriately sets the constituent elements of the computer system 80 such that the computer port identified by the specified computer port identifier can access the logical unit identified by the specified logical unit identifier.

A procedure RemoveAllowedHosts receives as parameters an identifier of one logical unit and an identifier of at least one computer port and appropriately sets the constituent elements of the computer system 80 such that the computer port identified by the specified computer port identifier cannot access the logical unit identified by the specified logical unit identifier.

A procedure AllowToAccess receives as parameters an identifier of one computer port and an identifier of at least one logical unit and appropriately sets the constituent elements of the computer system 80 such that the port identified by the specified computer port identifier can access the logical unit identified by the specified logical unit identifier.

A procedure DenyToAccess receives as parameters an identifier of one computer port and an identifier of at least one logical unit and appropriately sets the constituent elements of the computer system 80 such that the computer port identified by the specified computer port identifier cannot access the logical unit identified by the specified logical unit identifier.

Four procedures described above are used to set the LUN security. These procedures can be implemented as follows. In this regard, a setting unit provided by a vendor of each storage device as a unit opened to the public is beforehand related to the storage device used in the management program 120. This can be easily conducted.

In the setting of a storage device having the LUN security function, a worldwide name (WWN) is generally used as a specifier of an external port which can access a logical unit, and an identifier of a port of the storage device and the logical unit number (LUN) are used as a specifier of the logical unit. The identifier of the storage device port is described in a format according to the storage device as shown in the fourth item of the table 3900.

Each procedure accesses the tables 3100, 1600, and 3900 to obtain, using the logical unit identifier received as a parameter, an identifier of a storage device in which the logical unit is arranged. To conduct an operation for a storage device, a port of the storage must be specified. A value for the port can be obtained from the fourth item of the table 3900. According to the values obtained as parameters, each procedure uses the unit provided by the vendor of the storage device as a unit opened to the public to thereby conduct operation for the LUN security.

In the setting of a computer having the LUN security function, it is assumed that a program to set the LUN security is running on the computer and the management program 120 can send data indicating a change of the setting of the LUN security via the communication unit 7 to the LUN security setting program. According to the indication from the management program 120, the LUN security setting program changes the setting of the LUN security for a device driver of a fibre channel host bus adapter of the computer on which the LUN security setting program is running. This operation requires parameters for the fibre channel host bus adapter, namely, a logical unit number (LUN) of the logical unit as a target unit of the setting operation and a worldwide name (WWN) of the storage device port having a path to the logical unit. The management program 120 obtains these values from the tables 3600 and 3900 and sends the obtained values to the LUN security setting program. For the management program 120 to sends an indication via the communication unit 7 to the LUN security setting program, a correspondence of addresses such as IP addresses between the computer port and the communication unit 7 of the computer is required. The correspondence, specifically, required values can be obtained from the table 3800.

Description will be now given of four procedures to set zones.

A Procedure AddToZone receives as parameters one zone identifier and at least one port identifier and adds the port identified by the port identifier to the zone identified by the zone identifier by operating the fabric switch 4.

A Procedure removeFromZone receives as parameters one zone identifier and at least one port identifier and removes the port identified by the port identifier from the zone identified by the zone identifier by operating the fabric switch 4.

A Procedure CreateZone is a procedure to create a new zone. The procedure receives as parameters one identifier of a new zone in a format depending on the fabric switch 4 and at least one port identifier and creates, by operating the fabric switch 4, a new zone which contains the port identified by the port identified and which has the zone identifier received as a parameter.

A procedure RemoveZone receives one zone identifier as a parameter and removes the zone identified by the zone identifier by operating the fabric switch 4.

These procedures can be implemented as follows. In this regard, a unit to conduct the setting to the fabric switch 4 is beforehand opened to the public.

In the unit opened to the public for the fabric switch 4, worldwide name (WWN) is generally used as an identifier of a port. In the embodiment, the WWN of the port can be obtained from the table 3800 or 3900. The value used as a zone specifier to operate the fabric switch 4 can be obtained from the table 3500. Therefore, using the above values as parameters, it is possible in each procedure to conduct the zoning operation by the unit opened to the public to operate the fabric switch 4.

In the following description regarding user's operations, six procedures defined in the command process block 121 will be used as follows.

A procedure GetEntering is a procedure which receives an identifier and coordinate values of a symbol as parameters to output a list of areas on the screen 1000, each of the areas containing the specified coordinate values and not containing the specified symbol. In the procedure, a list of areas each of which contains the coordinate values is temporarily created in the memory 12 by referring to the table 3200. Any area in the list for which it is found by referring to the table 3300 that the area contains the specified symbol is removed from the list. The resultant list is outputted from the procedure.

A procedure GetLeaving is a procedure which receives an identifier and coordinate values of a symbol as parameters to output a list of areas on the screen 1000, each of the areas containing the specified symbol and not containing the specified coordinate values. In the procedure, a list of areas each of which contains the symbol is created by referring to the table 3300. Any area in the list for which it is found by referring to the table 3200 that the area contains the coordinate values is removed from the list. The resultant list is outputted from the procedure.

A procedure GetHostPortsInListOfArea is a procedure which receives a list of identifiers of areas to output a list of identifiers of computer port symbols contained in all areas of the list. In the procedure, for the respective areas of the specified list, symbols contained in the areas are obtained by referring to the table 3300 to output a list containing the obtained symbols.

Also, GetStoragePortsInListOfArea is a procedure which receives a list of identifiers of areas as parameters to output a list of identifiers of storage device port symbols contained in all specified areas. GetLusInListOfArea is a procedure which receives a list areas as parameters to output a list of identifiers of logical unit symbols contained in all specified areas. However, the elements of the lists outputted from three procedures described above are not duplicated between the lists.

A procedure CheckConnectivity receives identifiers of two port symbols and outputs "truth" if connectivity is present between the port symbols indicated by the identifiers and "false" if connectivity is absent between the port symbols indicated by the identifiers. The procedure is implemented as follows. For each of the specified port symbols, a list of areas containing the port symbols is created by referring to the table 3300 to be temporarily stored in the memory 12. Two lists thus created are then examined. If there exists an area contained in both lists, it is assumed that connectivity is present between the ports.

A procedure IsAllowedFor receives an identifier of one computer port symbol and an identifier of at least one logical unit symbol as parameters and determines whether or not the specified computer port symbols can access the specified logical unit symbols on the screen 1000. The procedure is implemented as follows. For each specified logical unit symbol, identifiers of storage device ports having paths to the logical unit symbol are obtained from the table 3600. For each of the obtained identifiers of the storage device port symbols, CheckConnectivity is executed using the specified identifier of the computer port symbol. If it is determined as a result that connectivity exists for the identifiers of the storage device port symbols, "truth" is outputted. Otherwise, "false" is outputted.

A procedure IsAcessibleFrom receives an identifier of one logical unit symbol and an identifier of at least one computer port symbol as parameters and determines whether or not the specified computer port symbols can access the specified logical unit symbols on the screen 1000.

The procedure is implemented as follows. A search is made through the table 3600 to obtain identifiers of storage device port symbols having paths to the specified logical unit symbol. For each of the obtained storage device port symbols, identifiers of all valid areas to which the storage device port symbols belong are obtained from the tables 3200 and 3300. A list of the identifiers of the areas is created to be temporarily stored in the memory 12. A check is made for each pair of an identifier in the list and the specified identifier of the computer port symbol to determine whether or not the pair is contained in the table 3300. If any pair is not contained in the table 3300, the procedure outputs "false". Otherwise, the procedure outputs "true".

Description has been given of the procedure defined in the embodiment. Next, description will be given of processing of the management program 120 and the management console program 220 when the user moves a computer port symbol displayed on the screen 1000.

Figure 19:
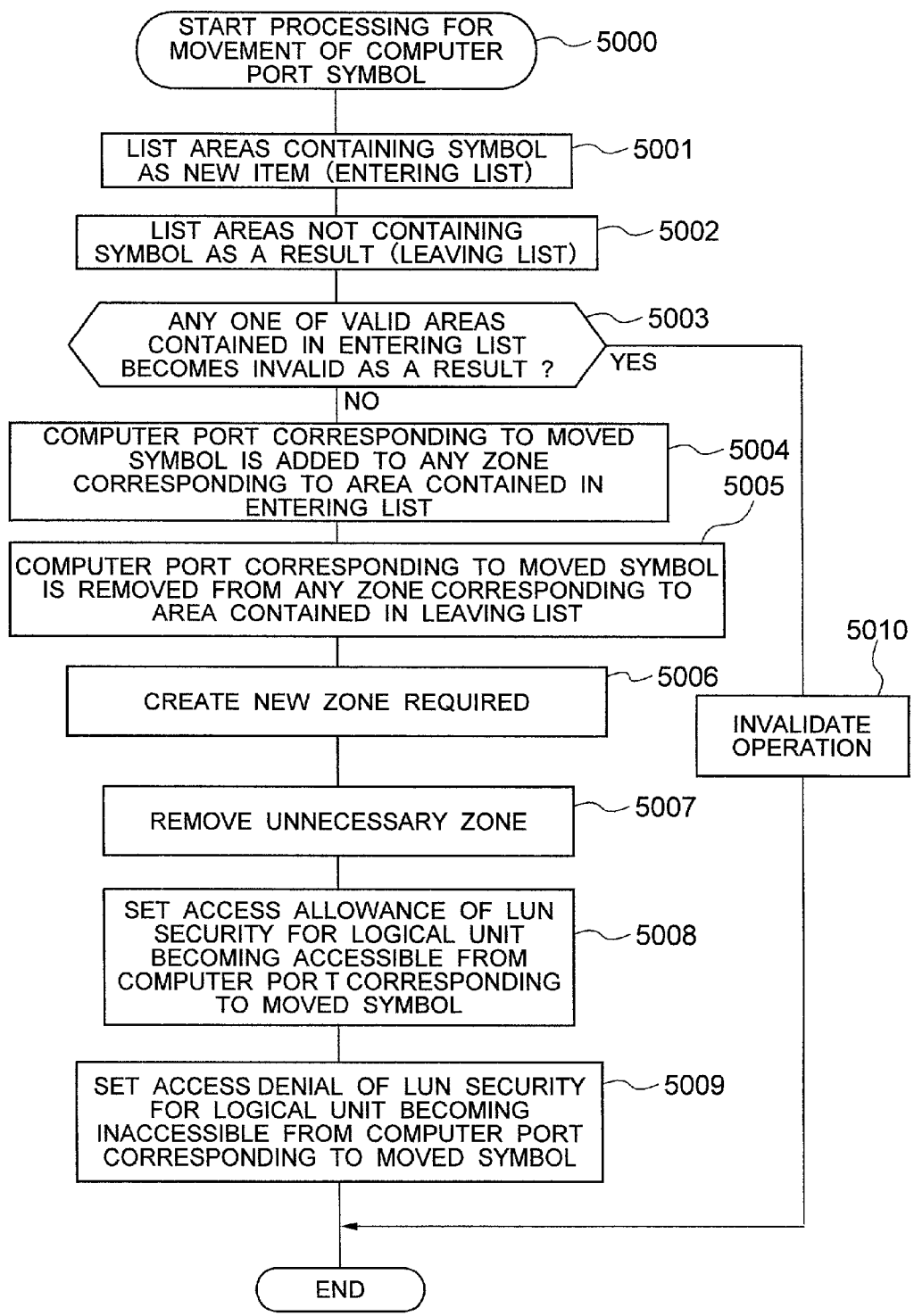
FIG. 19 is a flowchart for explaining processing to move a computer port symbol.

FIG. 19 shows a flowchart 5000 of processing executed by the command process block 121 in the management program 120 when a symbol indicating a computer port is moved. When the user moves a computer port symbol, the GUI process block 223 of the management console program 220 running on the computer 2 generates a set of data including an identifier of the moved symbol, coordinate values of the destination of the movement, and a value indicating the movement of the computer port symbol and transmits the data via the communication unit 7 to the control program 120 running on the management computer 1.

In the control program 120, the communication block 123 receives the data sent from the management console program 220 and then passes the data to the command process block 121. The block 121 analyzes the received data. When it is detected that the computer port symbol is moved, the command process block 121 starts processing of the flowchart shown in FIG. 19. The processing will next be described by referring to FIG. 19.

In step 5001, the command process block 121 executes the procedure GetEntering using as parameters the identifier of the moved symbol and the coordinate values of the movement destination, creates a list of identifiers of all areas containing the moved symbol as a new item, and temporarily stores the list in the memory 12. The list will be called as "Entering" hereinbelow.

In step 5002, the command process block 121 executes the procedure GetLeaving using as parameters the identifier of the moved symbol and the coordinate values of the movement destination, creates a list of identifiers of all areas not containing the moved symbol as a result of the movement, and temporarily stores the list in the memory 12. The list will be called as "leaving" hereinbelow.

In step 5003, the command process block 121 determines whether or not any one of the valid areas identified by the identifiers contained in the entering list becomes invalid as a result of the addition of the computer symbol. If such an area is present, the process goes to step 5010 to invalidate the user's operation.

The determination is achieved specifically by executing the steps below. First, the command process block 121 refers to the table 3200 to generate a list containing valid areas identified by the identifiers contained in the entering list and temporarily stores the list in the memory 12. The command process block 121 then executes the procedure GetLusInListOfArea to obtain all identifiers of the logical unit symbols contained in the areas identified by the identifiers contained in the list. For all identifiers of the logical unit symbols, the command process block 121 refers to the table 3600 to obtain identifiers of the storage device port symbols having paths to the logical unit symbols, creates a list of the obtained identifiers of the storage device port symbols, and temporarily stores the list in the memory 12.

For the obtained identifiers of the storage device port symbols, the command process block 121 executes the procedure CheckConnectivity to determine whether or not connectivity exists between the storage device port symbols and the moved computer port symbol. If there exists any the storage device port symbol not having connectivity to the moved computer port symbol, either one of the areas identified by the identifiers contained in the entering list is changed from a valid state to an invalid state as a result of the user's operation to move the symbol. As described above, such an operation is regarded as invalid in the embodiment. Therefore, the process of the command process block 121 goes to step 5010 to send a message indicating rejection of the movement of the symbol to the management console program 220 to thereby terminate the processing. If all storage device port symbol have connectivity to the moved computer port symbol, the command process block 121 records a correspondence between the identifiers of the areas contained in the entering and leaving lists and the moved symbol in the table 3300. Control goes to a step 5004 to execute processing in which the setting operation is conducted to the computer system 80.

In steps 5004 and 5005, the zones are changed according to the movement of the symbol.

In step 5004, the computer port is added to a zone. Any identifier of a zone corresponding to the area identified by the identifiers contained in the entering list is obtained from the table 3500. Using as parameters the zone identifier and an identifier of the computer port indicated by the moved computer port symbol, the command process block 121 executes the procedure AddToZone to indicate the setting block 127 to add the computer port to the zone. The computer port identifier is obtained from the table 3100. Subsequently, the command process block 121 adds a record including the identifier of the zone to which the new port is added and the computer port to the table 3500.

In step 5005, the computer port is removed from the zone. The command process block 121 obtains from the table 3500 an identifier of a zone corresponding to an area identified by the identifiers contained in the leaving list and executes the procedure RemoveFromZone using the obtained zone identifier and the moved computer port as parameters to indicate the setting block 127 to remove the computer port from the zone. The command process block 121 removes a record including the identifier of the zone from which the port is removed and the removed computer port from the table 3500.

In steps 5006 and 5007, the command process block 121 creates a new zone necessary as a result of the symbol movement and removes a zone which becomes unnecessary as a result of the symbol movement. In the embodiment, it is assumed that for a valid area containing at least two port symbols (including a computer port or storage device port symbol), a zone corresponding to the area is set to the computer system 80. Also, no zone exists for a valid area containing at most one port symbol. Incidentally, a zone corresponding to an invalid zone is not created.

In step 5006, the command process block 121 executes processing to create a new zone corresponding to a valid area as a result of the addition of the computer port symbol. The area is a valid area which is identified by an identifier contained in the entering list and which contains two port symbols. The identifier of the area is obtained from the entering list and the table 3300.

For each area identifier thus obtained, the command process block 121 executes the procedure CreateZone using as parameters identifiers of two ports corresponding to two port symbols contained in the area and an identifier of a new zone in the fabric switch 4 to indicate the setting block 127 to create the new zone. The identifier of the new zone in the fabric switch 4 may be appropriately created by the command process block 121 or may be inputted via the management console program 220 from the user. The command process block 121 allocates a new identifier in the management program 120 to the new zone and writes a record including the identifier and the identifier of an area corresponding to the zone in the table 3500.

In step 5007, the command process block 121 executes processing when an area and a zone corresponding thereto become unnecessary as a result of the removal of the computer port symbol in a position outside the area. The area is a valid area which is identified by an identifier contained in the leaving list and which contains only one port symbol. The identifier of the area is obtained from the leaving list and the table 3300.

For each area identifier thus obtained, the command process block 121 obtains an area thereof and an identifier of a zone corresponding thereto from the table 3500. Using an identifier of the zone in the fabric switch 4 as a parameter, the command process block 121 executes the procedure RemoveZone to indicate the setting block 127 to remove a zone which becomes unnecessary. The command process block 121 also removes a record keeping a correspondence between the removed zone and the associated area from the table 3500.

Steps 5008 and 5009 changes the setting of the LUN security. In pre-processing of steps 5008 and 5009, the command process block 121 accesses the table 3200, selects valid areas from the areas identified by the identifiers contained in the entering list, and creates a list of identifiers of the selected valid areas to temporarily store the list in the memory 12. Using the created list of the obtained area identifiers as a parameter, the command process block 121 executes the procedure GetLusInListOfArea to obtain a list containing all identifiers of logical unit symbols contained by the areas identified by the identifiers contained in the created list. The obtained list will be referred to as "enteringlun" hereinbelow. Similarly, the command process block 121 obtains a list containing all identifiers of logical unit symbols contained by the valid areas identified by the identifiers contained in the leaving list. The obtained list will be referred to as "leavinglun" hereinbelow.

In step 5008, a logical unit accessible from a computer is set. To identify a logical unit which becomes accessible from the computer, the command process block 121 executes processing for the logical unit symbols which is contained in the enteringlun list obtained before and which is not contained in the leavinglun list obtained before to obtain identifiers of logical units corresponding to the logical unit symbols from the table 3100 and creates a list of the obtained logical unit identifiers to temporarily store the list in the memory 12. Using as parameters the list of the logical unit identifiers and a worldwide names (WWN) of the computer port corresponding to the moved symbol, the command process block 121 executes the procedure AllowToAccess to indicate the setting block 127 to conduct the setting of access allowance for the LUN security.

In step 5009, a logical unit inaccessible from a computer is set. In a manner converse that of step 5008, for the identifiers of the logical unit symbols which are contained in the leavinglun list obtained before and which are not contained in the enteringlun list obtained before, the command process block 121 obtains identifiers of logical units corresponding to the logical unit symbol identifiers from the table 3100 and creates a list of the obtained logical unit identifiers to temporarily store the list in the memory 12.

Subsequently, using as parameters the created list and a worldwide names (WWN) of the computer port corresponding to the moved symbol, the command process block 121 executes the procedure DenyToAccess to indicate the setting block 127 to conduct the setting of access denial for the LUN security. Thereafter, the command process block 121 notifies the normal termination of the processing to the management program 120 and terminates the processing.

Description will next be given of processing when the user moves a logical unit symbol on the screen 1000.

First, description will be given of a case in which a valid area is invalidated as a result of the movement of a logical unit symbol. Specifically, when a logical unit symbols is moved to a position in a valid area, the valid area becomes in valid. Even when a logical unit symbol is moved to a position outside an area, the area is not invalidated. If connectivity does not exist between a computer port symbol contained in an area and a storage device port symbol having a path to a logical unit symbol moved to the area, the area becomes invalid. As described above, any operation which makes an area invalid is not allowed in the embodiment. Therefore, the movement of a logical unit symbol to a valid area to resultantly make the area invalid is not allowed.

When the user moves a logical unit symbol on the screen 1000, the management console program 220 transmits, as in the movement of the computer port symbol, the identifier of the moved symbol, coordinate values of the destination of the movement, and a value indicating the movement of the logical unit symbol to the management program 120.

Figure 20:
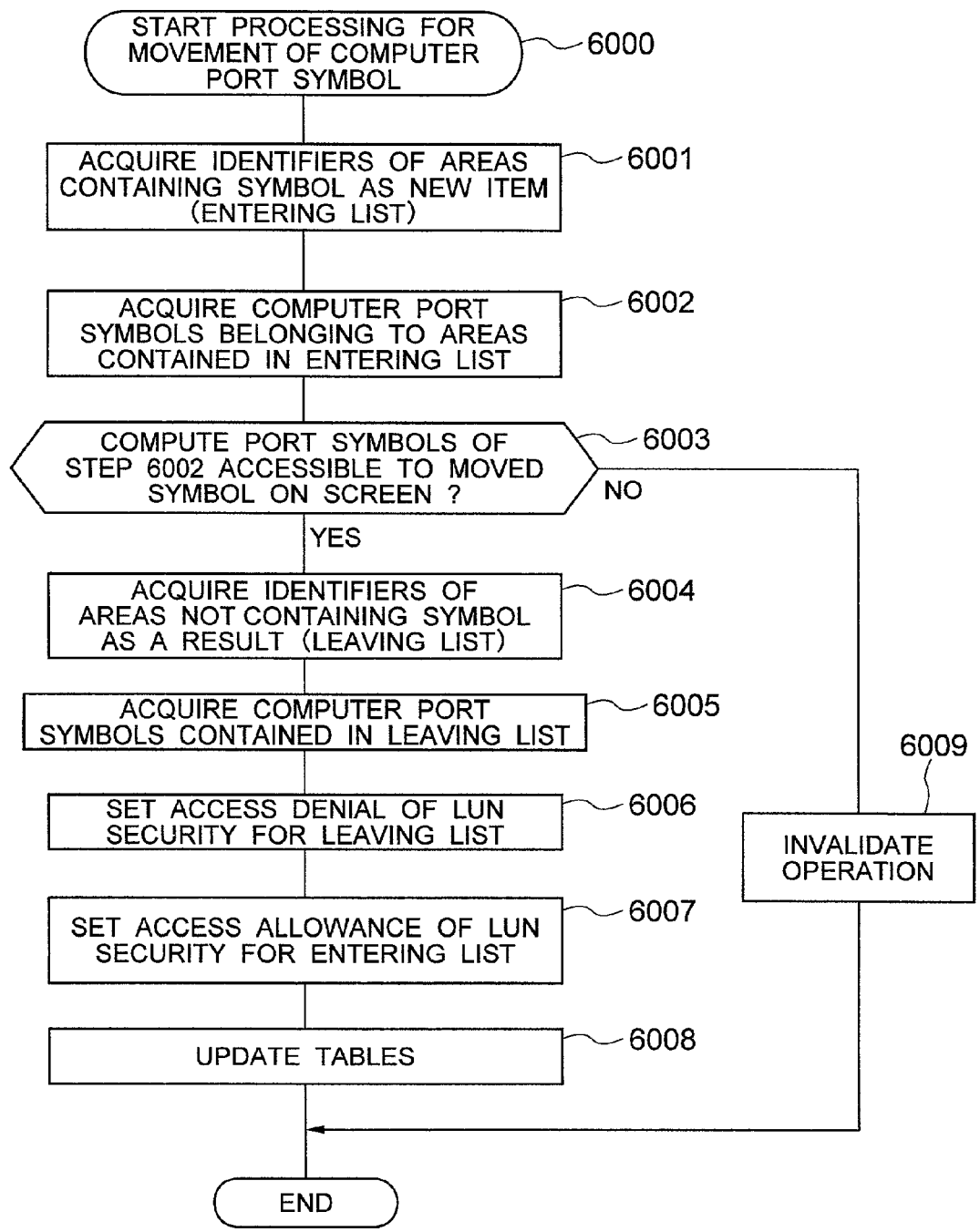
FIG. 20 is a flowchart for explaining processing to move a logical unit symbol.

In management program 120, data received by the communication block 123 is passed to the command process block 121. The block 121 analyzes the received data. When the movement of the logical unit symbol is detected, the command process block 121 starts processing of a flowchart 6000 shown in FIG. 20. The processing will be described by referring to FIG. 20.

In step 6001, using the identifier of the moved symbol and the coordinate values of the destination of the movement as parameters, the command process block 121 executes the procedure GetEntering to obtain a list of identifiers of areas to which the moved symbol is added as a new item. The list will be referred to as "entering" hereinbelow.

In step 6002, the command process block 121 refers to the table 3200 to generate a list of identifiers of the areas which are contained in the entering list and which are in a valid state and temporarily stores the list in the memory 12. Using the list as a parameter, the command process block 121 executes the procedure GetHostPortsInListOfArea to create a list of computer port symbol identifiers.

In step 6003, using the identifier of the moved symbol and the list of computer port symbol identifiers as parameters, the command process block 121 executes the procedure IsAccessibleTo to determine whether or not the moved symbol is accessible from all computer port symbols identified by the list of computer port symbol identifiers on the screen 1000. If the moved logical unit symbol is not accessible from any one of the computer port symbols identified by the list, control goes to step 6009, the user's operation is rejected, and the processing is terminated. Otherwise, control goes to step 6004.

In steps 6004 to 6007, the command process block 121 changes the setting of the LUN security.

In step 6004, using the identifier of the moved symbol and the coordinate values of the destination of the movement as parameters, the command process block 121 executes the procedure GetLeaving to obtain a list of identifiers of areas which do not contain the symbol as a result of the user's operation. The list will be referred to as "leaving" hereinbelow.

In step 6005, the command process block 121 refers to the table 3200 to create a list of valid areas identified by the identifiers of areas contained in the leaving list and temporarily stores the list in the memory 12. Using the list as a parameter, the command process block 121 executes the procedure GetHostPortInListOfArea to obtain a list of identifiers of computer port symbols. The command process block 121 refers to the table 3100 to obtain identifiers of computer ports corresponding to the computer port symbol identifiers contained in the list, creates a list of the computer port identifiers, and temporarily stores the list in the memory 12.

In step 6006, the command process block 121 refers to the table 3200 to obtain identifiers of logical units corresponding to the moved symbol. Using, as parameters, the obtained identifiers of logical units and the list of computer port identifiers created in step 6005, the command process block 121 executes the procedure RemoveAllowedHost to indicate the setting block 127 to set the LUN security function such that the computer port cannot access the logical units.

In step 6007, the command process block 121 refers to the table 3100 to obtain identifiers of computer ports corresponding to the identifiers contained in the list of computer port symbols created in step 6002, creates a list of the obtained computer port identifiers, and temporarily stores the list in the memory 12. Using the created list and the logical unit identifiers corresponding to the moved symbol as parameters, the command process block 121 executes the procedure AddAllowedHost to indicate the setting block 127 to set the LUN security function such that the computer port can access the logical units.

Finally, in step 6008, the command process block 121 synchronizes the screen 1000 and the tables after the update operation. Specifically, the command process block 121 sets new coordinate values to the second item of the record including the moved symbol in the table 3100, adds a record indicating a correspondence between the identifiers of the areas contained in the entering list and the identifiers of the moved symbol to the table 3300, and deletes a record indicating a correspondence between the identifiers of the areas contained in the leaving list and the identifiers of the moved symbol from the table 3300. The command process block 121 notifies the normal termination of the processing to the management console program 220 and then terminates the processing.

Next, description will be given of processing when the user moves a symbol indicating a storage device port on the screen 1000.

First, description will be given of the movement of the storage device port symbol and the handling of an invalid area. When the user moves a storage device port symbol to a position outside a valid area, connectivity thereof to computer port symbols is possibly lost depending on cases. Resultantly, areas containing computer port symbols of which connectivity to the storage device port symbol is lost and logical unit symbols having paths to the moved storage device port symbol become invalid areas.

In the embodiment, when an area becomes an invalid area as a result of the movement of a storage device port symbol, the movement of the storage device port symbol is invalidated as in the movement of a computer port symbol. Incidentally, even when a storage device port symbol is moved to a position in an area, any area does not become invalid.

Figure 21:
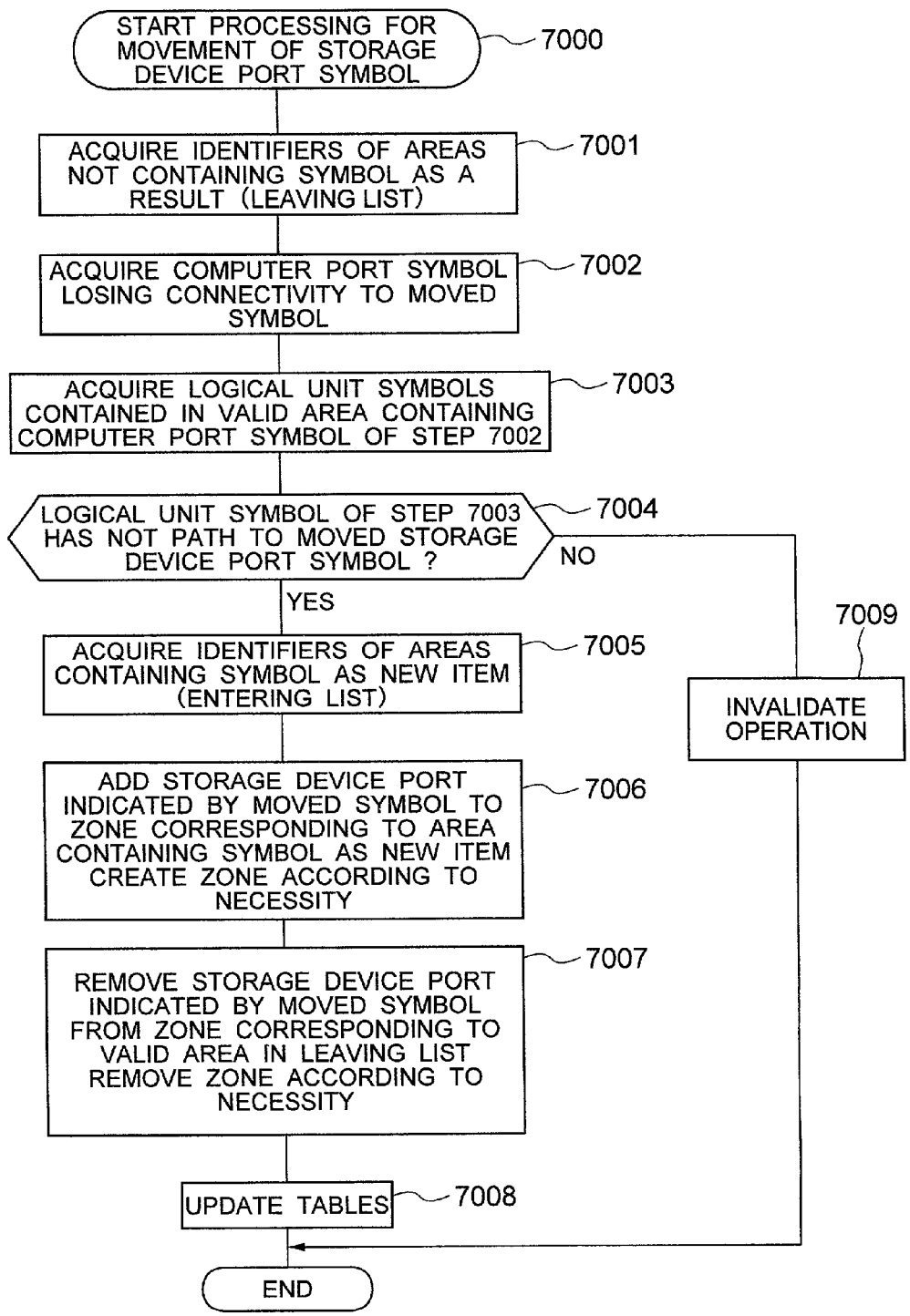
FIG. 21 is a flowchart for explaining processing to move a storage device port symbol.

Referring to a flowchart 7000 of FIG. 21, description will be given of processing when the user moves a storage device port symbol on the screen 1000.

When the user moves a storage device port symbol on the screen 1000, the management console program 220 sends to the management program 120 data including an identifier of the moved symbol, coordinate values of the destination of the movement, and a value indicating the movement of the storage device port symbol as in the movement of a computer port symbol.

In the management program 120, the communication block 123 receives the data sent from the management console program 220. The communication block 123 passes the data to the command process block 121. The block 121 analyzes the received data. When the movement of the storage device port symbol is detected, the command process block 121 starts processing of the flowchart 7000.

In step 7001, using the identifier of the moved symbol and the coordinate values of the destination of the movement as parameters, the command process block 121 executes the procedure GetLeaving to obtain a list of identifiers of areas not containing the moved symbol as a result. The list of the area identifiers will be referred to as "leaving" hereinbelow.

In step 7002, the command process block 121 refers to the table 3200 to create a list of areas in a valid state, the areas being identified by the identifiers of the areas contained in the leaving list. The block 121 temporarily stores the list in the memory 12. Using the created list as a parameter, the command process block 121 executes the procedure GetHostProtsInListOfArea to obtain a list of identifiers of computer port symbols losing connectivity to the moved storage device port symbol as a result. For each of the identifiers of the computer port symbols contained in the list, the command process block 121 determines whether or not connectivity between a computer port symbol identified by the identifier and the moved storage device port symbol is guaranteed by at least two areas. From the list created by referring to the table 3300, the command process block 121 removes any identifiers of the storage device port symbols of which the above connectivity is guaranteed as a result of the determination.

In step 7003, the command process block 121 makes a search through the tables 3200 and 3300 to create a list of variable areas to which the computer port symbols contained in the list created in step 7002 belong and temporarily stores the list in the memory 12. Using the created list as a parameter, the command process block 121 executes the procedure GetLusInListOfArea to obtain a list of identifiers of logical unit symbols belonging to the areas. The obtained logical unit symbols can be accessed on the screen 1000 from the computer port symbols of which connectivity to the storage device port symbol indicated by the moved symbol is lost.

In step 7004, the command process block 121 makes a check to determine whether or not any one of the identifiers of the logical unit symbols contained in the list obtained in step 7003 has a path to the moved symbol. Specifically, command process block 121 refers to the table 3600 to determine whether or not any one of the logical unit symbols has a path to the moved storage unit port symbol. If there exists such a logical unit symbol having a path to the moved storage unit port symbol, the user's operation is invalid for the following reason. The logical unit symbol checked in this operation can be accessed on the screen 1000 by the computer port symbol of which connectivity to the moved symbol is lost.

As above, when the user's operation is regarded as invalid, control goes to step 7009. The command process block 121 notifies the invalidity of the movement of the symbol to the management console program 220 and then terminates the processing. The management console program 220 restores the screen 1000 to the state before the movement of the symbol.

In step 7004, if the user's operation is not invalid, control goes to step 7005 to acquire an identifier of an area to which the moved symbol is added as a new item. Using the identifier of the moved storage device port symbol and the coordinate values of the moved symbol after the movement as parameters, the command process block 121 executes the procedure GetEntering to obtain a list of identifiers of areas to which the storage device port symbol is added as a new item. The list will be referred to as "entering" hereinbelow.

In step 7006, the command process block 121 selects areas of which the identifiers are contained in the entering list and which are in the valid state, and refers to the table 3500 to obtain the identifiers of zones corresponding to the selected areas.

For each of the identifiers of zones, the command process block 121 executes the procedure AddToZone using as parameters the zone identifier and an identifier of a storage device port indicated by the moved symbol, the identifier being obtained from the table 3100. The block 121 thereby indicates the setting block to add a new storage device port to the zones. For an area not having a zone corresponding thereto, the command process block 121 refers to the table 3300 to acquire therefrom an identifier of a port symbol contained in the area. If there exists a port symbol contained in the area, the command process block 121 executes the procedure CreateZone to create a zone containing a port indicated by the port symbol and the storage device port indicated by the moved symbol. An identifier of a new zone which is a parameter to be passed to the procedure CreateZone and which is used in the fabric switch 4 may be appropriately created by the command process block 121 in advance or may be indicated from the user to the management console program 220.

The command process block 121 appropriately assigns an identifier to the created zone, the identifier being used in the management program 120. The block 121 adds to the table 3500 a record including the identifier of the new zone, an area corresponding to the zone on the screen 1000, and an identifier of the zone for the fabric switch 4. For an area which does not have a zone corresponding thereto and which does not contain any port symbol, the command process block 121 does not change the setting of the zones.

In step 7007, for areas which are identified by the identifiers of the areas contained in the leaving list and which are in the valid state, the command process block 121 refers to the table 3500 to obtain therefrom zones corresponding to the areas, respectively. Using the zone identifiers and the identifier of the storage device port indicated by the moved symbol as parameters, the command process block 121 executes the procedure RemoveFromZone to indicate the setting block to remove the storage device port from the zones.

When only one port remains in the zone by removing the storage device port from the zone, namely, when the zone contains only the moved symbol and the port symbol, the command process block 121 executes the procedure RemoveZone using the identifier of the zone for the fabric switch 4 to indicate the setting block to remove the zone. The block 121 also removes a record keeping information of the removed zone.

Finally, in step 7008, the command process block 121 sets the coordinate values after the movement of the symbol to the coordinate values in the second item of the record corresponding to the storage device port in the table 3100 and reflects the relationship between the entering and leaving lists and the storage device port symbol indicated by the moved symbol in the table 3300. Thereafter, the command process block 121 notifies the normal termination of the processing to the management console program 220 and terminates the processing.

The creation of an area will be next described. The user can operate the pointing device 25 to create an area on the screen 1000. To create an area on the screen 1000, the user operates the pointing device 25 to move the cursor 1070 to a position of a vertex of a new area to be created. Assume that the cursor 1070 is at a position outside any existing area.

Subsequently, the user operates the pointing device 25 with the button 25*a* thereof kept depressed to move the cursor 1070 to a desired position in the screen 1000. A rectangle is displayed on the screen 1000. In the rectangle, a line segment from a point of coordinate values at which the button 25*a* is depressed to a point of coordinate values of the cursor 1070 is a diagonal thereof. When the user moves the cursor 1070 to a desired position, the user releases the button 25*a*. A new area is a rectangle of which the diagonal is drawn between the point of coordinate values at which the button 25*a* is depressed and the point of coordinate values at which the button 25*a* is released. Through the sequence of operations, the user can specify a position and a size of a desired area to indicate the management program 120 to create the area.

In the embodiment, when a new area thus created is an inconsistent area, the area is created as an invalid area. This occurs in a case in which when a created area contains logical unit symbols and computer port symbols, any one of the computer ports indicated by the computer port symbols cannot access any one of the logical units indicated by the logical unit symbols. That is, connectivity is absent between any one of the storage device port symbols having paths to the logical unit symbols and any one of the computer port symbols.

Figure 22:
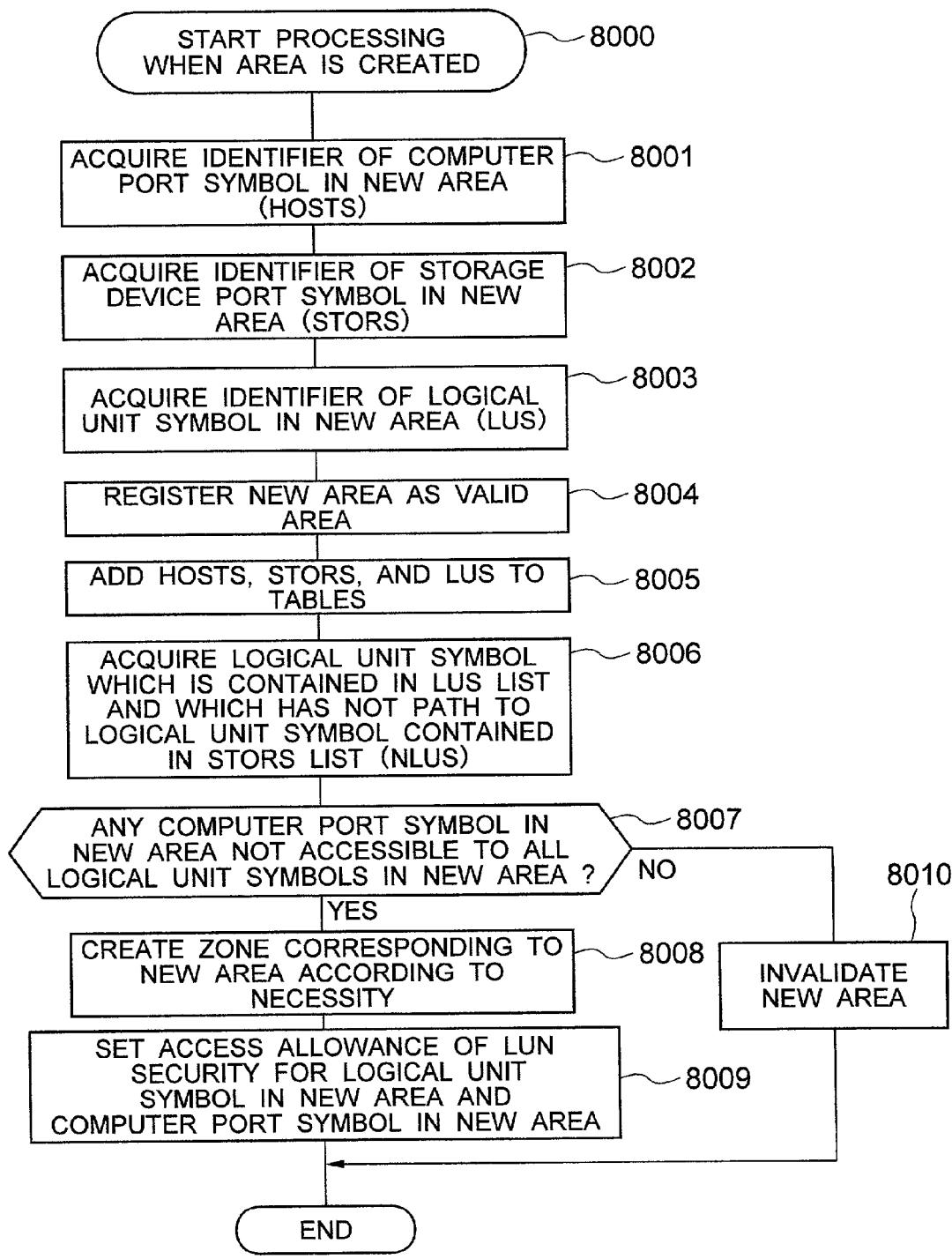
FIG. 22 is a flowchart for explaining processing to generate areas.

Next, processing steps will be described. FIG. 22 shows in a flowchart 8000 the processing when the user creates an area. The area created by the user will be referred to as "new area" hereinbelow.

Assume that the user conducts the area creating operation described above. The management console program 220 sends data including a value indicating the creation of an area and the coordinate values respectively of upper-left and lower-right corners of the new area to the management program 120.

In the management program 120, the communication block 123 receives the data sent from the management console program 220 and then transfers the received data to the command process block 121. The block 121 analyzes the received data. If the creation of the area is confirmed, the command process block 121 starts the processing of the flowchart 8000.

In step 8001, the command process block 121 makes a search through the table 3100 to create a list of identifiers of computer port symbols contained in the rectangle of the new area having the diagonal drawn from the upper-left corner to the lower-right corner, and temporarily storage the list in the memory 12. The list will be referred to as "hosts" hereinbelow.

In step 8002, the command process block 121 similarly creates, as in step 8001, a list of identifiers of storage device port symbols contained in the new area and temporarily storage the list in the memory 12. The list will be referred to as "stors" hereinbelow.

In step 8003, the command process block 121 similarly creates, as in step 8001, a list of identifiers of logical unit symbols contained in the new area and temporarily storage the list in the memory 12. The list will be referred to as "lus" hereinbelow.

In step 8004, to record the new area in the table 3100, the command process block 121 adds to the table 3200 a record including a new identifier assigned to the new area, a range thereof, a name thereof to be displayed on the screen, and a value indicating validity of the new area. The identifier to be assigned to the new area is appropriately selected by the command process block 121, the identifier being not used in the table 3200. The name of the new area to be displayed on the screen may be inputted by the user to a dialog box displayed by the management console program 220 or may be appropriately generated by the command process block 121.

In this regard, the new area is assumed as a valid area because the procedure IsAccessibleTo is executed in step 8007. The procedure is used to determine whether or not a logical unit can be accessed from a computer port. The area for the determination is limited to a valid area. Therefore, the new area is temporarily recorded as a valid area in the table 3200. Whether or not the new area is valid is later verified in step 8007. If it is determined that the new area is invalid, the validity flag of the record added to the table is updated to invalidate the new area.

In step 8005, to record information that identifiers of the symbols contained in the hosts, stors, and lus lists are contained in the new area, the command process block 121 adds to the table 3300 a record for each symbol identifier including a new identifier assigned in step 8004 to the new area and the symbol identifier.

In step 8006, the command process block 121 makes a search through the table 3600 to obtain a logical unit symbol which is identified by the logical unit symbol identifiers contained in the lus list and which has not a path to any storage device port symbol identified by the storage device port symbol identifiers contained in the stors list. The block 121 creates a list of the logical unit symbol identifiers and temporarily stores the list in the memory 12. The list will be referred to as "nopathlus" hereinbelow.

In step 8007, the command process block 121 search for computer port symbol which is identified by the computer port symbol identifiers contained in the hosts list and which cannot access on the screen to any logical unit symbol identified by the logical unit symbol identifiers contained in the hopathlus list. Specifically, for each identifier of the computer port symbol contained in the hosts list, the command process block 121 executes the procedure IsAccessibleTo using the identifier of the computer port symbol and the nopathlus list as parameters to determine whether or not "false" results from the procedure. If "false" results for any one of the identifiers of the computer port symbols, the command process block 121 assumes that the new area is invalid and sets the validity flag of the fourth item in the record of the new area in the table 3200 to indicate that the new area is invalid. Then, control goes to step 8010. If "false" does not result, control goes to step 8008.

In step 8008, if the new area contains at least two computer port symbols or two storage device port symbols, the command process block 121 creates a zone corresponding to the new area. Specifically, if the host and stors lists contain two or more symbol identifiers, the command process block 121 executes the procedure CreateZone using a list of the symbol identifiers contained in the host and stors lists and an identifier assigned to the new area for the fabric switch 4 as parameters. This indicates the setting block 127 to create a new zone. The identifier assigned to the new area for the fabric switch 4 may be appropriately selected by the command process block 121 or may be inputted by the user to a dialog box or the like displayed by the management console program 220.

To the created zone, the command process block 121 appropriately assigns a zone identifier for use in the management program 120 and then adds to the table 3500 a record including the assigned zone identifier, and an identifier of an area corresponding to the zone, and the identifier of the zone for the fabric switch 4.

In step 8009, the command process block 121 sets the LUN security such that the computer port indicated by each computer port symbol contained in the new area can access each logical unit symbol contained in the new area. Specifically, for each identifier of the computer port symbol contained in the hosts list, the command process block 121 obtains an identifier of a computer port corresponding thereto from the table 3100. Using as parameters the obtained identifier of the computer port and a list of the identifiers of the logical unit symbols contained in the lus list and the identifiers of the logical units corresponding thereto, the command process block 121 executes the procedure AllowToAccess to indicates the setting block 127 to a new setting operation for the LUN security.

After the processing of step 8009 is completely finished, the command process block 121 notifies the validity of the new area via the communication block 127 to the management console program 220 and then terminates the processing. When control goes from step 8007 to 8010, the command process block 121 notifies the invalidity of the new area to the management console program 220. According to the notification, the program 220 draws the new area as a valid area or an invalid area on the screen 1000.

Next, description will be given of processing when the user conducts operation to invalidate an area.

In the embodiment, the user can conduct operation to invalidate an area on the screen 1000. However, when another area becomes invalid as a result of the invalidation of an area, the management program 120 invalidates the user's operation as in the symbol moving operation.

Another area becomes invalid as a result of the invalidation of an area in the following case. In a case in which a computer port symbol and a storage device port symbol contained in an area to be invalidated by the user commonly belong only to the area to be invalidated, when the area is invalidated, connectivity between the computer port symbol and the storage device port symbol is lost. In this situation, if the computer port symbol of which connectivity to the storage device port symbol is lost can access on the screen 1000, via an area other than the area to be invalidated, the logical unit symbol having a path to the storage device port symbol, the area for which the accessibility is guaranteed becomes an invalid area because connectivity is lost between the storage device port symbol and the computer port symbol.

In the embodiment, the user's operation to invalidate an area and the operation of the management console program 220 are as follows. Assume that the management console program 220 has the table 3200 of the management program in advance. First, the user operates the pointing device 25 to move the cursor 1070 to a position in a desired area on the screen 1000 and then depress a button 25b. The GUI process block 223 of the management console program 220 records coordinate values of the cursor 1070 on the screen 1000 when the user depresses the button 25b.

Next, the GUI process block 223 displays a menu containing a display item "invalidate area" on the screen 1000. The user selects "invalidate area" from the displayed menu to indicate the management program to invalidate a desired area. When the management console program 220 detects that the selected item is "invalidate area", the program 220 makes a retrieval through a table which is beforehand acquired and which has the contents equal to those of the table 3200 of the management program 120 to thereby select an area containing the coordinate values recorded when the menu is displayed. If two or more areas contain the coordinate values, the management console program 220 displays a dialog box presenting names of the areas to such that the user selects one of the areas to be invalidated.

Figure 23:
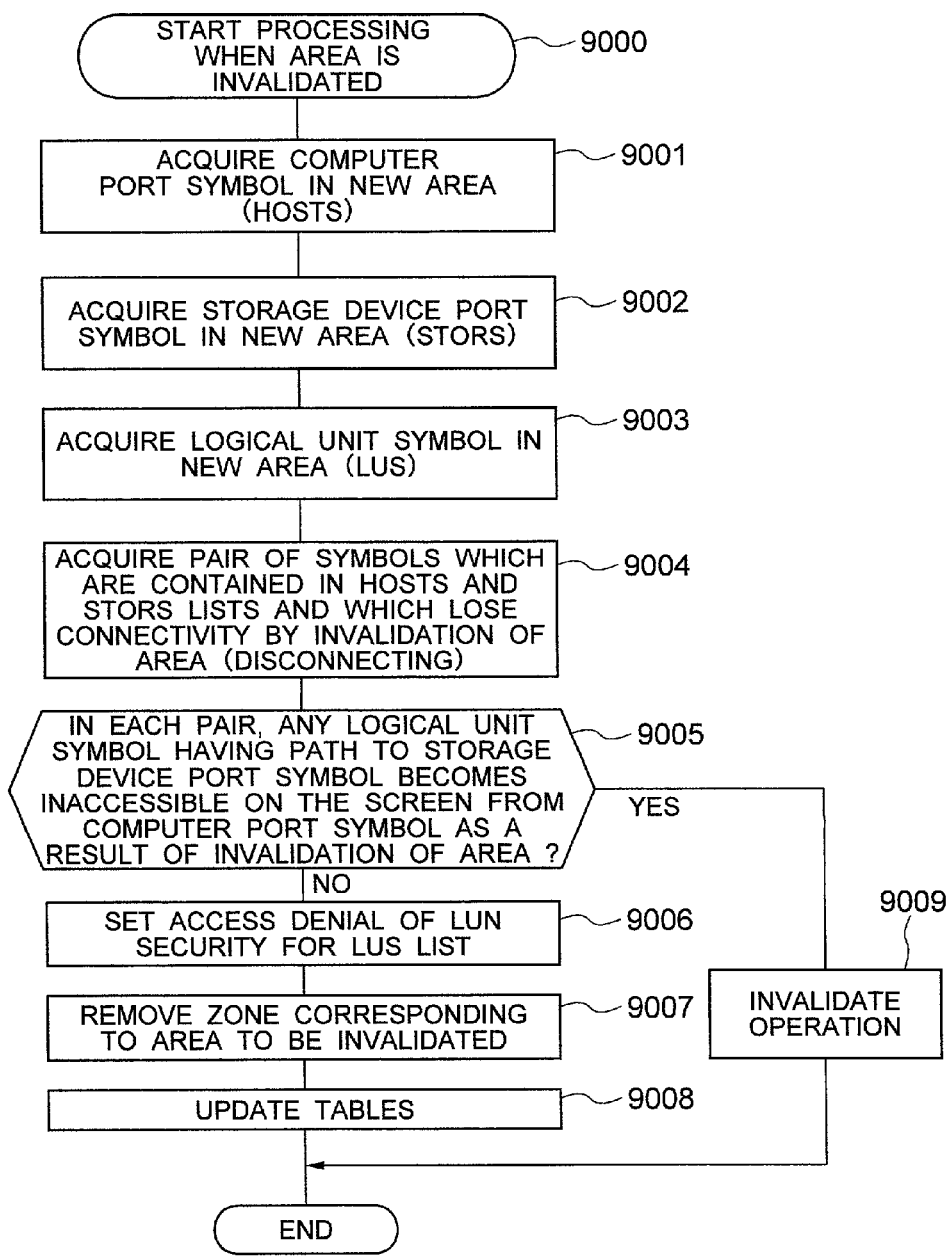
FIG. 23 is a flowchart for explaining processing to invalidate areas.

When the invalidation of the area is indicated by the user's operation as above, the management console program 220 sends data including a value indicating the invalidation of the area and an identifier of the are to be invalidated via the communication unit 7 to the management program 120. Processing of the management program 120 when the user indicates invalidation of an area is shown in a flowchart 9000 of FIG. 23.

In the management program 120, the data sent from the management console program 220 is received by the communication block 123 to be sent to the command process block 121. When the block 121 detects that the invalidation of an area is indicated, the block 121 executes processing of the flowchart 9000.

In step 9001, the command process block 121 refers to the table 3300 to create a list of identifiers of computer port symbols contained in the area to be invalidated and temporarily stores the list in the memory 12. The list is referred to as "hosts" hereinbelow.

In step 9002, the command process block 121 refers to the table 3300 to create a list of identifiers of storage device port symbols contained in the area to be invalidated and temporarily stores the list in the memory 12. The list is referred to as "stors" hereinbelow.

In step 9003, the command process block 121 refers to the table 330 to create a list of identifiers of logical unit symbols contained in the area to be invalidated and temporarily stores the list in the memory 12. The list is referred to as "lus" hereinbelow.

In step 9004, the command process block 121 accesses the identifiers of the computer port symbols contained in the hosts list and the identifiers of the storage device port symbols contained in the stors list and selects therefrom pairs of the respective identifies of the computer port symbol and the storage device port symbol between which connectivity is guaranteed only by the area to be invalidated. The command process block 121 creates a list of the selected pairs and temporarily stores the list in the memory 12. The list is referred to as "disconnecting" hereinbelow.

Specifically, for the identifier of each storage device port symbol in the stors list, command process block 121 selects any valid area which contains the storage device port symbol indicated by the identifier and for which invalidation is not indicated and refers to the tables 3100 and 3300 to acquire an identifier of the valid area. The command process block 121 refers to the table 3200 to determine whether or not the area contains a computer port symbol identified by the computer port symbol identifier contained in the hosts list. If there exists a computer port symbol not contained in any valid area thus obtained, the command process block 121 adds a pair of the identifier and the storage device port symbol identifier to the disconnecting list.

In step 9005, the command process block 121 determines whether or not the operation to invalidate the area is valid. For each pair of the computer port symbol identifier and the storage device port symbol identifier in the disconnecting list, the command process block 121 refers to the table 3600 to obtain an identifier of a logical unit symbol having a path to the storage device port symbol identified by the storage device port symbol of the pair including the computer port symbol identifier and the storage device port symbol. For each identifier of the logical unit symbol, the command process block 121 refers to the table 3300 to obtain an identifier of an area which contains the logical unit symbol and which is not to be invalidated. The command process block 121 refers to the table 3300 to determine whether or not the area contains the computer port symbol paired with the storage device port symbol. If the area contains the computer port symbol, since the area becomes an invalid area as a result of the user's operation, the command process block 121 invalidates the user's operation, and control goes to step 9009. The block 121 notifies the invalidity of the user's operation to the management console program 220 and terminates the processing.

In step 9006, the command process block 121 changes the setting of the LUN security for the computer ports which cannot access the logical units as a result of the invalidation of the area. For each identifier of the logical unit symbols in the lus list, the command process block 121 creates a list of identifiers of computer port symbols which are contained in the hosts list and which can access the logical unit symbol and then temporarily stores the list in the memory 12.

Specifically, the command process block 121 refers to the table 3300 to obtain a list of identifiers of areas each of which contains the logical unit symbol and which is not the area to be invalidated. The block 121 again refers to the table 3300 to obtain a list of identifier of computer symbols each of which does not belong to any area identified by the area identifiers thus obtained and each of which is contained in the hosts list. The block creates a list of identifiers of such computer port symbols for each logical unit symbol contained in the lus list.

Using the list of computer port symbols created as above, the command process block 121 indicates the setting block 127 to change the setting of the units for the LUN security. Specifically, for each identifiers of logical unit symbols contained in the lus list, the block 121 refers to the table 3100 to create a list of identifiers of computer ports each of which corresponds to each of identifiers contained in the list of computer port symbol identifiers created as above. Using the created list and an identifier of the logical unit corresponding to the identifier of the logical unit symbol as parameters, the command process block 121 executes the procedure RemoveAllowedHosts of the setting block 127.

In step 9007, if the area to be invalidated has a zone corresponding thereto, the command process block 121 removes the zone. Specifically, the block 121 makes a search through the table 3500 for such a zone corresponding to the area to be invalidated. If the zone is present, the block 121 executes the procedure RemoveZone of the setting block using an identifier of the zone for the fabric switch 4. The block 121 then removes a record of the removed zone from the table 3500.

Finally, in step 9008, the command process block 121 accesses the record of the table 3200 associated with the area to be invalidated to change the value of the third item thereof to indicate the invalidation of the area, notifies the normal termination of the processing via the communication block 123 to the management console program 220, and terminates the processing. Having received the notification of the normal termination of the area invalidation, the program 220 displays the area as an invalid area.

Incidentally, the menu described above may include an item displayed as "remove area". When the user selects the menu item, an area is removed. However, an area to be removed is an area which can be invalidated in the embodiment. Therefore, when the menu item "remove area" is selected, the management program 120 and the management console program 220 execute processing to invalidate an area and then executes processing to remove the area.

Specifically, after the processing steps to invalidate an area are executed up to step 9007 and the area is invalidated, the command process block 121 of the management program 120 deletes a record associated with the invalidated area in the table 3200, deletes all records of which the first item indicates areas to be removed in the table 3300, notifies the normal termination of the processing via the communication block 123 to the management console program 220, and terminates the processing. Having received the notification of the normal termination of the area removal, the program 220 removes the indicated area from the image displayed on the screen 100.

Next, description will be given of an operation to change an invalid area to a valid area.

To validate an invalid area, the symbols contained in the invalid area must be consistent with each other. When the invalid area to be validated contains logical unit symbols and computer port symbols, connectivity must exist between all computer port symbols must and port symbols having paths to the logical unit symbols.

Figure 24:
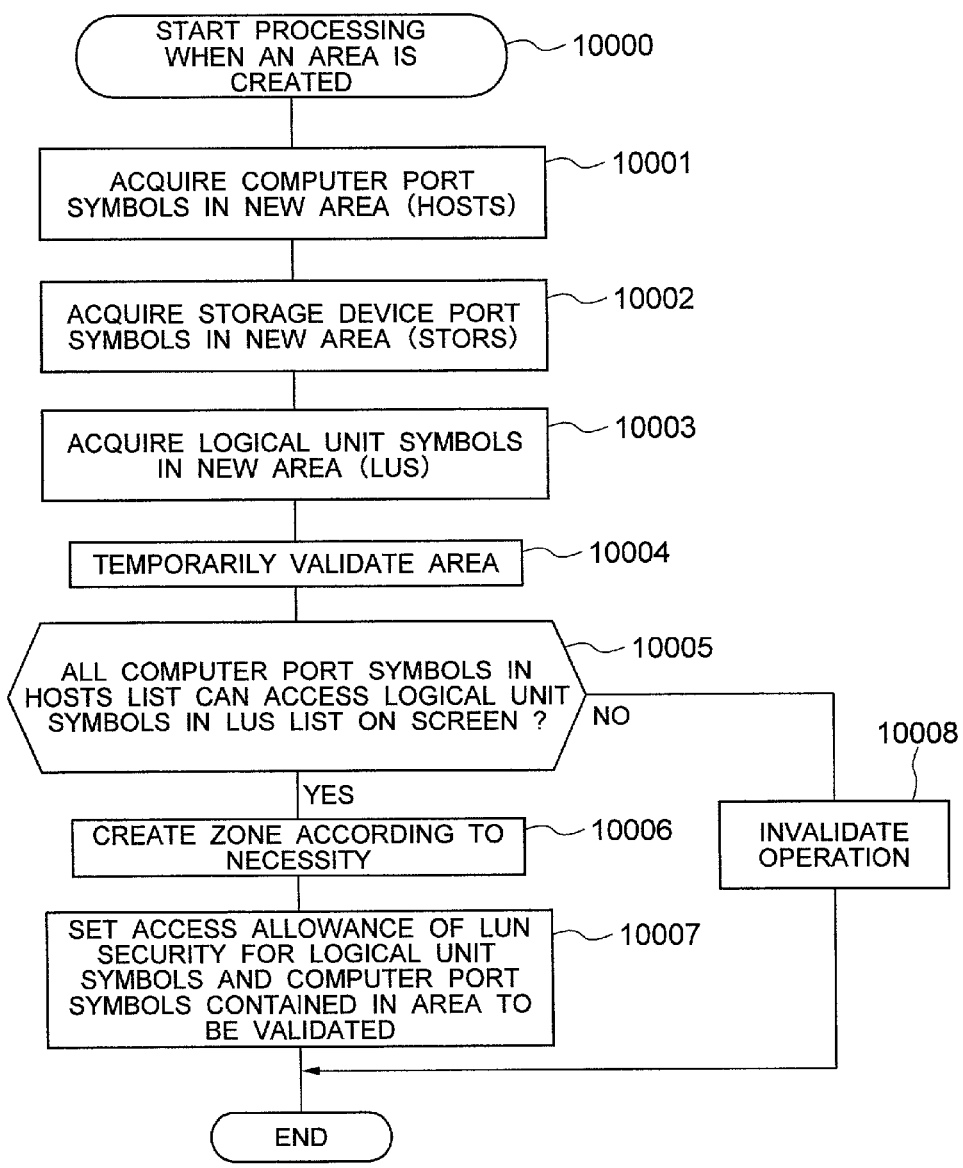
FIG. 24 is a flowchart for explaining processing to validate areas.

Description will now be given of when the user conducts an area validating operation in the screen 1000 to when the setting of units are completed. Processing of the command process block 121 when the user changes an invalid area to a valid area in a flowchart of FIG. 24.

The user operates the pointing device 25 to move the cursor 1070 on the screen 1000 to a position in an area to be validated and then depresses the button 25b of the pointing device 25. Having detected the depression of the button 25b, the management console program 220 records the position of the cursor 1070 at the depression of the button 25b and displays a menu including an item "validate area" in the vicinity of the cursor 1070 on the screen 1000. The user selects "validate area" in the menu to indicate the management console program 220 to validate the area containing coordinate values of the position of the cursor 1070.

When a plurality of invalid areas contain the point indicated by the coordinate values of the cursor 1070, the management console program 220 requests the user to select an invalid area, namely, displays a dialog box for the user to select one of the invalid areas and then terminates the processing.

When the user selects one invalid area to be validated, the management console program 220 sends to the management program 120 data including a value indicating the validation of the area and an identifier of the area to be validated. It is assumed that the identifier of the area is determined according to data equal to that of the table 3100 obtained from the management program by the management console program 220 in advance.

In the management program 120, the communication block 123 receives the data sent from the management console program 220 and passes the data to the command process block 121.

The block 121 analyzes the received data. When the indication of the area validation is detected, the block 121 starts the processing of the flowchart 1000.

In step 10001, the command process block 121 refers to the table 3300 to create a list of identifiers of computer port symbols contained in the area to be validated, and temporarily stores the list in the memory 12. The list is referred to as "hosts" hereinbelow.

In step 10002, the command process block 121 refers to the table 3300 to create a list of identifiers of storage device port symbols contained in the area to be validated, and temporarily stores the list in the memory 12. The list is referred to as "stors" hereinbelow.

In step 1003, the command process block 121 refers to the table 3300 to create a list of identifiers of logical unit symbols contained in the area to be validated, and temporarily stores the list in the memory 12. The list is referred to as "lus" hereinbelow.

In step 10004, to temporarily validate the invalid area to be validated, the command process block 121 changes the validity flag in the fourth item of the record associated with the area to indicate that the area is valid for the following reasons. That is, in step 10005, to determine whether or not each computer port symbol identified by the identifiers of computer port symbols in the hosts list can access on the screen each logical unit symbol identified by the identifiers of logical unit symbols in the lus list, the area to be validated must be validated in advance.

In step 10005, whether or not the area can be validated. This is specifically achieved as follows. For each identifier of the computer port symbols in the hosts list, the command process block 121 executes the procedure IsAllowedFor using the identifier of the computer port symbol and the lus list.

If the procedure results in "false" for any one of the identifiers of computer port symbols, it is assumed that the computer port symbol cannot access the logical unit symbol on the screen and hence the area cannot be validated. In this case, control goes to step 10008 in the command process block 121. Conversely, when it is confirmed that the computer port symbols identified by the identifiers of computer port symbols in the hosts list can access on the screen the logical unit symbols identified by the identifiers of logical unit symbols in the lus list, control goes to step 10006 in the command process block 121.

In step 10006, if it is required to create a zone corresponding to the area to be validated, the command process block 121 creates the zone. Processing to create the zone is similar to that of step 8008 to create an area.

In step 10007, for all logical units corresponding to the identifiers of logical unit symbols in the lus list, the command process block 121 sets the access allowance of the LUN security such that the logical units can be accessed from computer ports corresponding to the identifiers of computer port symbols in the hosts list. This processing is similar to that of step 8009 to create an area.

If it is confirmed that the validation of the area is appropriate in step 10005, the command process block 121 notifies, after completely executing the processing of step 1007, the normal termination of the processing to the management console program 220, and terminates the processing.

If it is confirmed that the validation of the area is not appropriate in step 10005, the command process block 121 executes step 10008 after step 10005. In step 10004, the block 121 restores the state of the table 3200 changed by the step 1004 to the original state. That is, the block 121 changes the validity flag in the third item of the record associated with the area to be validated in the table 3200 such that the validity flag indicates that the area is invalid. Thereafter, the block 121 notifies denial of the validation of the area via the communication block 123 to the management console program 220 and then terminates the processing.

Having received the notification of the normal termination of the processing from the management program 120, the management console program 220 displays as a valid area the area for which validation was indicated.

Description will now be given of processing when the user changes the size or position of a valid area on the screen 1000.

To change the size of an area, the user operates the pointing device 25 to move the cursor 1070 to a position on a boundary of a desired area on the screen 1000. The user then depresses the button 25a of the pointing device 25, operates the pointing device 25 with the button 25a kept depressed to move the cursor 1070 to a desired position, and releases the button 25a. During the operation, the display block 222 of the management console program 220 keeps displaying with a broken line a circumference of a rectangle determined on the screen when the button 25a is released. The area size can be changed by moving an edge of the rectangle on which the cursor 1070 exists when the user depresses the button 25a.

If the cursor 1070 indicates a top edge or a bottom edge of the area when the user depresses the button 25a, the management console program 220 moves the edge in a vertical direction in response to user's operation of the pointing device 25. If the cursor 1070 indicates a right or left edge of the area when the user depresses the button 25a, the management console program 220 moves the edge in a horizontal direction in response to user's operation of the pointing device 25. If the cursor 1070 is over a vertex of the area when the user depresses the button 25a, the management console program 220 changes the size of the area by changing the coordinate values of the vertex.

To change the position of an area, the user operates the pointing device 25 to move the cursor 1070 to a position over a desired area on the screen 1000. The user then depresses the button 25a of the pointing device 25, operates the pointing device 25 with the button 25a kept depressed to move the cursor 1070 to a desired position, and releases the button 25a. During the operation, the display block 222 of the management console program 220 keeps displaying with a broken line a circumference of a rectangle indicating a position after the movement of the area indicated by the cursor 1070 when the user depressed the button 25a.

When the user releases the button 25a, the GUI process block 223 determines that the rectangle drawn by the broken line is the position of the new area. If the coordinate values of the cursor 1070 is contained in a plurality of areas when the user depresses the button 25a of the pointing device 25, the display block 222 of the management console program 220 displays a dialog box for the user to select an area. The user selects a desired area from the dialog box and conducts an area moving operation.

When the user releases the button 25a and the new size or position of the area is determined, the management console program 220 sends to the management program 120 a value indicating the area size or position change, an identifier of the area of which the size or position is changed, and the coordinate values of an upper-left corner and a lower-right corner of the area.

Figure 25:
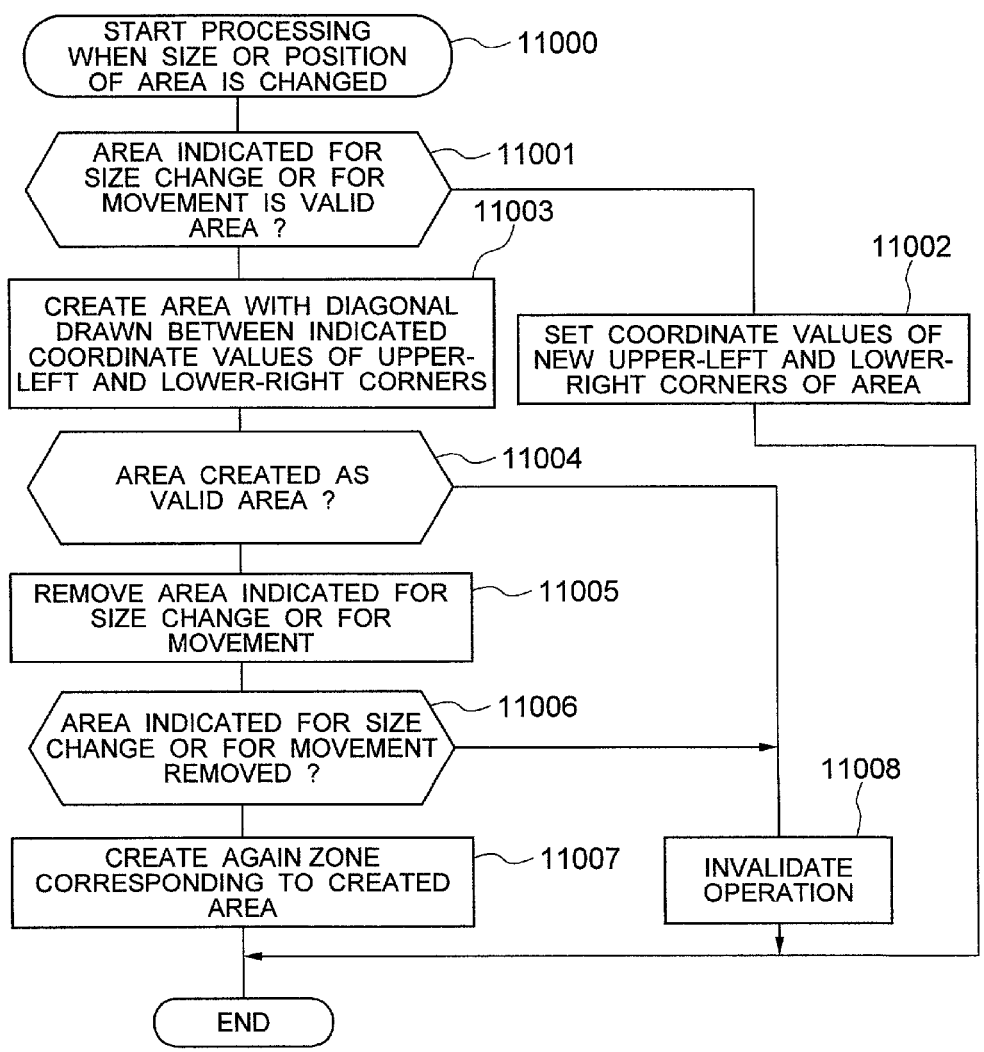
FIG. 25 is a flowchart for explaining processing to change size or a position of an area.

The communication block 123 of the management program 120 passes the received data to the command process block 121. The block 121 analyzes the received data. When the area size or position change is detected, the block 121 starts the processing of the flowchart 11000 of FIG. 25.

In step 11001, the command process block determines the area of which the size or position is changed is a valid area or an invalid area. If the area is an invalid area, control goes to step 11002. If the area is a valid area, control goes to step 11003.

In step 11002, the command process block 121 writes the new coordinate values of the upper-left corner and the lower-right corner of the area in the second item of the record in the table 3100 keeping information of the area of which the size or position is changed. The block 121 makes a retrieval through the table 3100 to acquire identifiers of computer port symbols, computer symbols, and logical unit symbols which belong to the area as a result of the area size or position change and adds for each thereof a record indicating the inclusion thereof in the area to the table 3200. Similarly, for each of identifiers of computer port symbols, computer symbols, and logical unit symbols which do not belong to the area as a result of the area size or position change, the block 121 removes a record associated therewith from the table 3200.

In step 11003, the command process block 121 creates an area having an upper-left corner and a lower-right corner indicated by the coordinate values thereof through the processing of the flowchart 8000. If it is necessary to create a zone corresponding to the created area, the block 121 uses an identifier of the zone for the fabric switch 4 to create the zone. The identifier is appropriately created by the block 121 or is inputted from the user through operation of the management console computer 2.

In step 11004, the command process block 121 determines whether or not the area created in step 11003 is a valid area. If the area is an invalid area, control goes to step 11008 in the block 121. If the area is a valid area, control goes to step 11005 in the block 121.

In step 11005, the command process block 121 tries to remove, according to the processing of the flowchart 9000, the area of which the size or position is changed. However, the block 121 does not reflect the removal of the area on the screen 1000.

In step 11006, the command process block 121 determines whether or not the area of which the size or position is changed is removed. If the area cannot be removed, control goes to step 11008 in the block 121. If the area can be removed, control goes to step 11007 in the block 121.

In step 11007, when the created area has a zone corresponding thereto and a zone corresponding thereto before the removal of the area, the command process block 121 executes the procedure CreateZone to create a new zone containing ports which are the same as those corresponding to the created zone. An identifier of the new zone thus created may be an identifier of the zone for the fabric switch 4, the zone corresponding to the removed area before the removal of the area. Or, the identifier may be inputted in step 11003 from the user through operation of the management console computer 2.

The command process block 121 executes the procedure RemoveZone to remove a zone corresponding to the created area. However, this processing is executed to equalize an identifier of the zone corresponding to the created zone to an identifier of the zone for the fabric switch 4, the zone corresponding to the removed area. Therefore, if there exists an alternative method, the method may be used. Or, the processing need not be necessarily executed.

After the processing is completed up to step 11007, the command process block 121 notifies the normal termination of the processing to the management console program 220 and terminates the processing.

In step 11008, the command process block 121 removes the area created by step 11003 according to the processing of the flowchart 8000, notifies invalidity of the user's operation to the management console program 220 and terminates the processing.

Having received the notification of the normal termination of the processing, the management console program 220 displays the area of which the size or position is changed, according to the new size or position on the screen 1000. If the notification is not received, the management console program 220 displays the area of which the size or position is changed, according to the original size or position.

Figure 26:
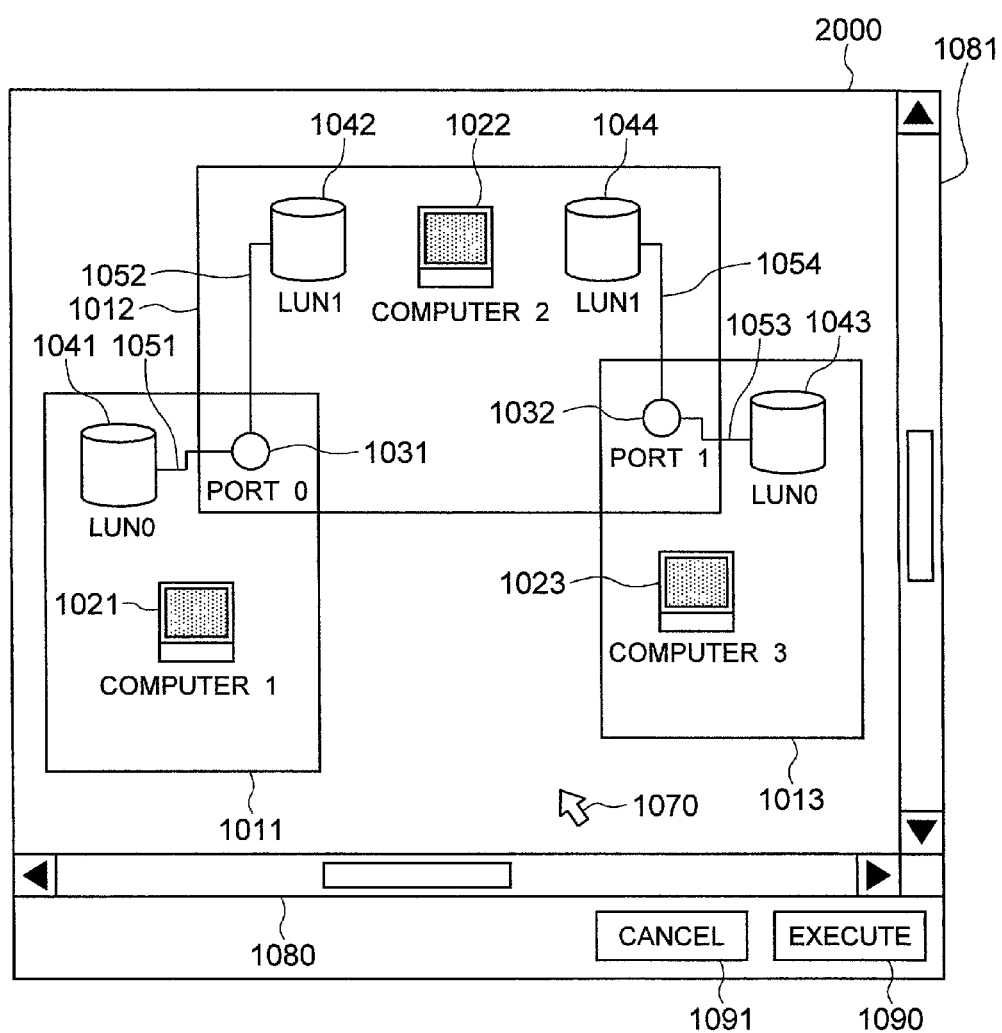
FIG. 26 is a diagram showing another display example on the display of FIG. 3.

Description has been given of embodiments of the present invention. In the embodiments, when a valid area becomes an invalid area as a result of a user's operation, the operation is regarded as invalid. However, it is also possible that the operation to change a valid area to an invalid area is regarded valid. In such a case, an "execute" button 1090 and a "cancel" button 1091 are added to the screen 1000. FIG. 26 shows a layout of the screen 2000 implemented by adding the "execute" button 1090 and the "cancel" button 1091 to the screen 1000.

The user successively conducts movement of a plurality of symbols and operations for areas on the screen 2000. In the process, when a valid area displayed on the screen 2000 becomes invalid, the display block 222 displays the area as an invalid area. Conversely, when an invalid area displayed on the screen 2000 becomes valid, the display block 222 displays the area as a valid area. After the sequence of operations are completed, the user clicks the "execute" button 1090. That is, the user operates the pointing device 25 to move the cursor 1070 over the "execute" button 1090 and depresses and then releases the button 25a of the pointing device 25. In the operation, the management console program 220 notifies changed positions of the screen 2000 caused by the sequence of the user's operations to the management program 120.

The program 120 changes the configuration of the computer system 80 according to the change of the screen 2000. However, if an invalid area is being displayed on the screen 2000 when the user clicks the "execute" button 1090, the management console program 220 does not notify the changed positions of the screen 2000 to the management program 120. When the user starts operation and at least an invalid area exists in the screen 2000, the management console program 220 displays the "execute" button in a light color indicating that the click of the "execute" button is invalid. The user can recognize that the operation sequence is in process if the "execute" button is in a light color or if an invalid area exists on the screen 2000.

When the user clicks the "cancel" button during the operation sequence, the display block 222 restores the state of the screen 2000 to the state before the user's operation and displays the "execute" button in a light color.

In the embodiments described above, the management object is a computer system 80 using a fibre channel as a unit to access a storage area. However, the present invention is also applicable to a computer system using an internet protocol as a method to access the storage area.

In such a computer system using an internet protocol as a method to access the storage area, it is possible to manage a virtual local area network (VLAN) of the ethernet in a method similar to the zoning method. It is also possible to manage a storage device having an internet small computer system interface (iSCSI) function in a manner similar to that of the LUN security. In this case, to identify ports of a computer and a storage device, an identifier address and/or an internet protocol (IP) address of a network interface adapter of the computer and/or the storage device is/are used in place of the worldwide name (WWN). Moreover, the present invention is also applicable to a computer system using the fibre channel and the internet protocol at the same time to access a storage area.

According to the present invention, it is possible to provide a security management program in a storage network in which it is not necessary for the user to pay attention to two security levels of the zoning and the LUN security. The management program provided by the present invention relieves the user of the operation for the respective units connected to the storage network.

According to the present invention, even when the setting of the units connected to the storage network becomes inconsistent as a result of a user's operation, the management program beforehand detects the inconsistency. This consequently prevents a user's wrong setting of the units connected to the storage network.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A computer system, comprising:
   a plurality of computers each having a computer port coupled to a network;
   a plurality of storage apparatuses each having storage ports coupled to said network and logical units storing data from said computers;
   a plurality of switch apparatuses each having switch ports coupled to either said computers or a storage system via said network; and
   a management module that manages states of connections among said computers, said switch apparatuses and said plurality of storage apparatuses;
   wherein said management module comprises:
   a correspondence table which indicates relations between a plurality of symbols each indicating a port of said computers, said plurality of storage apparatuses and said plurality of switch apparatuses, and display coordinate values of a display screen,
   a path table which indicates relations between said symbols and connections among said computers, said plurality of storage apparatuses and said plurality of switch apparatuses, a connection state display module for displaying on said display screen a state of said connections in said computer system, a zone table which indicates relations between a plurality of zones and said symbols indicating said computers, said plurality of storage apparatuses and said plurality of switch apparatuses, and an input module for inputting a user's request for creating new connections among said symbols on said display screen and changing said connections among said symbols on said display screen, wherein said connection state display module comprises:

a display module for displaying on said display screen said symbols of said computers, said plurality of storage apparatuses, and the state of said connections at positions indicated by said coordinate values in a graphic image, and a create module for creating, by use of said input module, an area displaying said plurality of computers and said plurality of storage apparatuses on said display screen, wherein said management module further comprises:

a display position comparing module for comparing, based on said coordinate values and said user's request, respectively a graphic image display position of said graphic image of said computers and said plurality of storage apparatuses in said connection state display module with a graphic image display position of an area created by use of said input module, and a setting module for setting said plurality of storage apparatuses and said plurality of switch apparatuses according to a result of the comparison by said display position comparing module, wherein said management module refers to, in response to zoning information, an area in said zone table and said correspondence table to display symbols for computer ports and storage ports included in a zone corresponding to said zone information on said display screen, wherein said management module sets an access restriction to a logical unit not to be accessed from said computer ports when a symbol of said logical unit is placed out of said zone, and wherein when said user's request includes an instruction for creating a connection between symbols of computers, storage apparatuses and said plurality of switch apparatuses not included in said zone table, said user's request is invalidated.

2. A computer system according to claim 1, wherein the area created by said input module of said connection state display module in said management means overlaps with other areas; and wherein said display position comparing module sets, when the area overlaps with other areas and the overlapped areas contain a graphic image of said computer or said storage apparatus, said storage apparatus and said switch apparatus according to a positional relationship between each of the areas and the graphic image based on said coordinate values and said user's request.

3. A computer system according to claim 1, wherein the graphic image representing computers and storage apparatus displayed on said connection state display module in said management module can be moved by said input module, and wherein said display position comparing module compares, after the graphic image is moved by use of said input module, a positional relationship between an area and the graphic image and sets said storage apparatus and said switch apparatus according to a result of the comparison.

4. A computer system according to claim 1, wherein said setting module also sets computers according to a result of the comparison by said display position comparing module.

5. A computer system according to claim 1, wherein said management module sets an access restriction to a logical unit when whose symbol is placed out of said zone not to be accessed from said computer port whose symbol being placed within said zone.

6. A method of managing a connection relationship in a computer system which includes a plurality of computers each having a computer port coupled to a network, a plurality of storage apparatuses each having storage ports coupled to said network and logical units storing data from said computers, and a plurality of switch apparatuses each having switch ports coupled to either said computers or a storage system via said network, said method comprising the steps of:

preparing a correspondence table which indicates relations between a plurality of symbols each indicating a port of said computers, said plurality of storage apparatuses and said plurality of switch apparatuses, and display coordinate values, and a path table which indicates relations between said symbols and connections among said computers, said plurality of storage apparatuses and said plurality of switch apparatuses;

displaying an area representing said computers and said plurality of storage apparatuses on a management screen of a management module;

displaying symbols of said computers and said plurality of storage apparatuses in a graphic image on said management screen;

displaying, on said management screen, a state of said connections in said computer system;

preparing a zone table which indicates relations between a plurality of zones and said symbols indicating said computers, and said plurality of storage apparatuses and said plurality of switch apparatuses, inputting a user's request for creating new connections among said symbols on said management screen and changing said connections among said symbols on said management screen;

comparing, based on said coordinate values and said user's request, respectively information of positions of areas with information of positions of graphic images respectively of computers and said plurality of storage apparatuses on said management screen;

setting an interface for said storage apparatus according to a result of the comparison; and setting an interface for said switch apparatus according to a result of the comparison, wherein said management module refers to, in response to zoning information, an area in said zone table and said correspondence table to display symbols for computer ports and storage ports included in a zone corresponding to said zone information on said management screen, wherein said management module sets an access restriction to a logical unit not to be accessed from said computer ports when a symbol of said logical unit is placed out of said zone, and wherein when said user's request includes an instruction for creating a connection between symbols of computers, storage apparatuses and switch apparatuses not included in said zone table, said user's request is invalidated.

7. A method of managing a connection relationship in a computer system according to claim 6, further comprising the steps of:
   changing a position and a size of an area on said management screen; and
   changing a position of each of the graphic images respectively representing computers and storage apparatus on said management screen.

8. A method of managing a connection relationship in a computer system according to claim 6, further comprising the step of:
   when a position and a size of an area on said management screen is changed or when a position of each of the graphic images respectively representing computers and storage apparatus on said management screen is changed, determining for each area whether or not the computers and the storage apparatus have valid connectivity therebetween in the area.

9. A method of managing a connection relationship in a computer system according to claim 6, further comprising the step of:
   setting connection for the computers according to a result of the comparison of said positional information comparing step.

10. A method according to claim 6, wherein said management module sets an access restriction to a logical unit when whose symbol is placed out of said zone not to be accessed from said computer port whose symbol being placed within said zone.

* * * * *